US011972697B2

(12) United States Patent
Trevino et al.

(10) Patent No.: US 11,972,697 B2
(45) Date of Patent: Apr. 30, 2024

(54) TRAINING PROSTHETIC FOR SELF-CANNULATION TRAINING

(71) Applicant: Fresenius Medical Care Holdings, Inc., Waltham, MA (US)

(72) Inventors: Samuel Trevino, San Ramon, CA (US); Daniel L. Sloat, Wakefield, MA (US); George Ioakimedes, Antelope, CA (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 220 days.

(21) Appl. No.: 17/717,091

(22) Filed: Apr. 10, 2022

(65) Prior Publication Data

US 2022/0230562 A1 Jul. 21, 2022

Related U.S. Application Data

(63) Continuation-in-part of application No. PCT/US2021/053876, filed on Oct. 7, 2021, which is a continuation-in-part of application No. 17/082,573, filed on Oct. 28, 2020, now Pat. No. 11,605,311.

(51) Int. Cl.
*G09B 23/28* (2006.01)
(52) U.S. Cl.
CPC .................. *G09B 23/285* (2013.01)
(58) Field of Classification Search
CPC ................................................ G09B 23/285
USPC ....................................................... 434/267
See application file for complete search history.

(56) References Cited

U.S. PATENT DOCUMENTS

| 5,112,228 | A | 5/1992 | Zouras |
| 5,839,904 | A | 11/1998 | Bloom |
| 8,690,580 | B2 | 4/2014 | Paronen |
| 9,460,638 | B2 | 10/2016 | Baker et al. |

(Continued)

FOREIGN PATENT DOCUMENTS

| JP | 20102107190 A | 9/2010 |
| KR | 102052037 A | 1/2018 |

OTHER PUBLICATIONS

Nasco, Life/form, "Hemodialysis Practice Arm LF01037U Instruction Manual" from www.mentone-educational.com.au/iv-access-injections/, (accessed Aug. 17, 2020).

(Continued)

*Primary Examiner* — Robert P Bullington
(74) *Attorney, Agent, or Firm* — Kilyk & Bowersox, P.L.L.C.

(57) ABSTRACT

A simulated cannula for a self-cannulation training system is provided. The simulated cannula includes a coupler that houses an LED light source and includes an electrical conductor and an optical fiber extending therefrom. The coupler can couple to a off-the-shelf cannula that can be easily modified for such purpose. The training system also includes a cannulation pad, a control unit, and first and second indicators. The control unit can include a rechargeable battery. The first indicator is activated when the cannula needle electrically completes the cannulation electrical circuit. The second indicator is activated when the cannula needle infiltrates or bypasses the simulated access and completes the infiltration electrical circuit. Methods of training a patient for self-cannulation, using the simulated cannula and training systems, are also provided.

16 Claims, 30 Drawing Sheets

(56) References Cited

U.S. PATENT DOCUMENTS

| | | |
|---|---|---|
| 2008/0269677 A1 | 10/2008 | Cull |
| 2013/0052626 A1 | 2/2013 | Hoskins |
| 2015/0100024 A1 | 4/2015 | Baker et al. |
| 2017/0316719 A1 | 11/2017 | Cull |
| 2018/0158373 A1 | 6/2018 | Hendrickson et al. |

OTHER PUBLICATIONS

Furuzono et al., "Development of a self-cannulation support device for home hemodialysis", Department of Bioengineering, Advanced Medical Engineering Center, National Cardiovascular Center Research Institute, vol. 43(3), pp. 325-328 (2010) (translation of abstract provided).

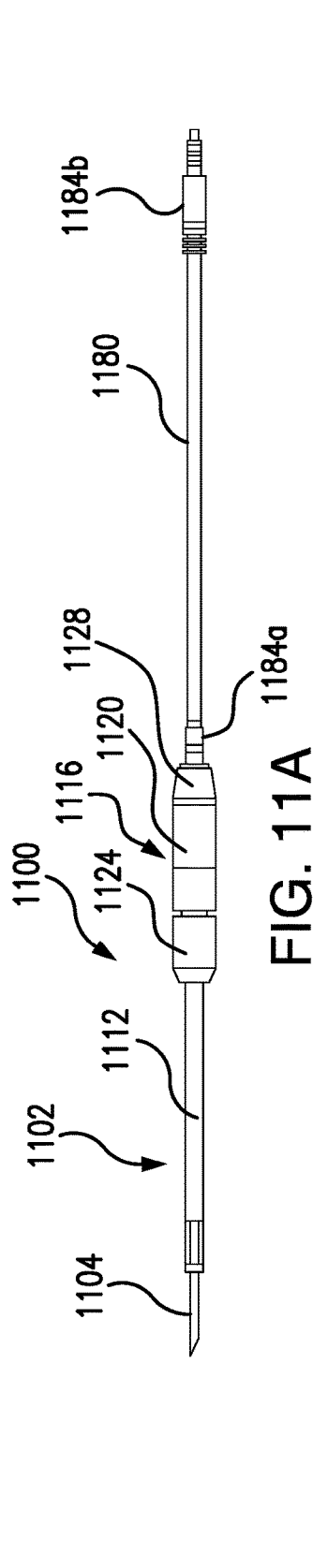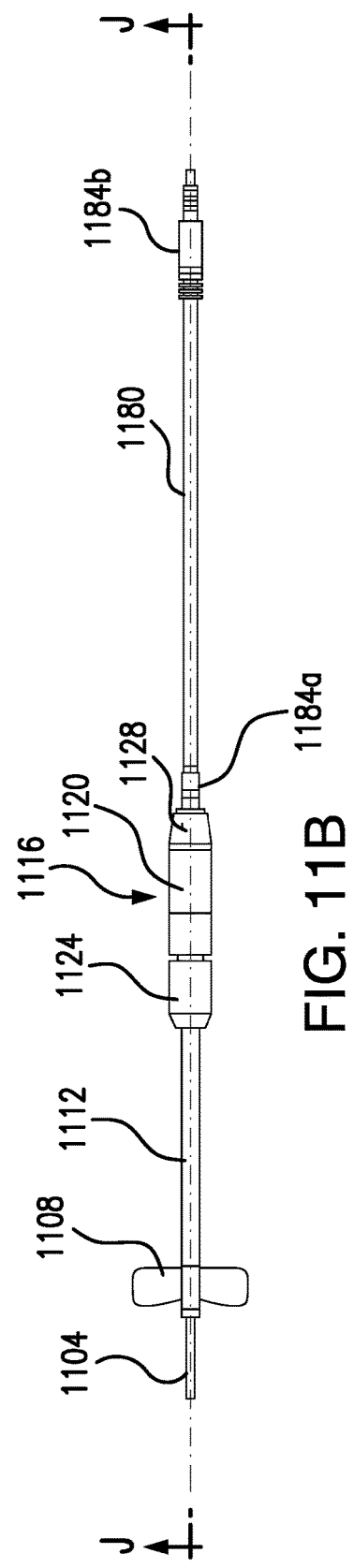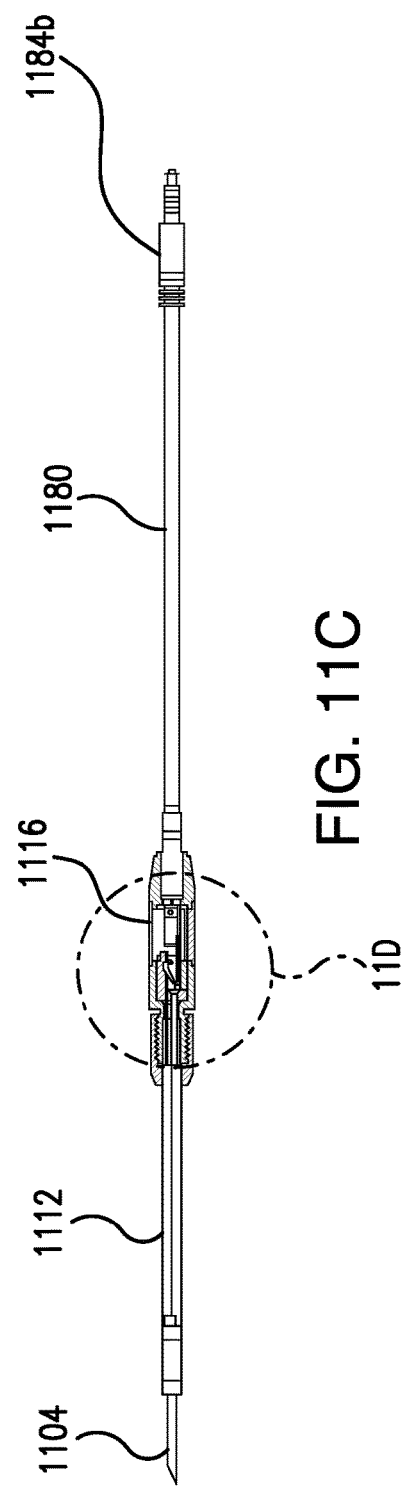

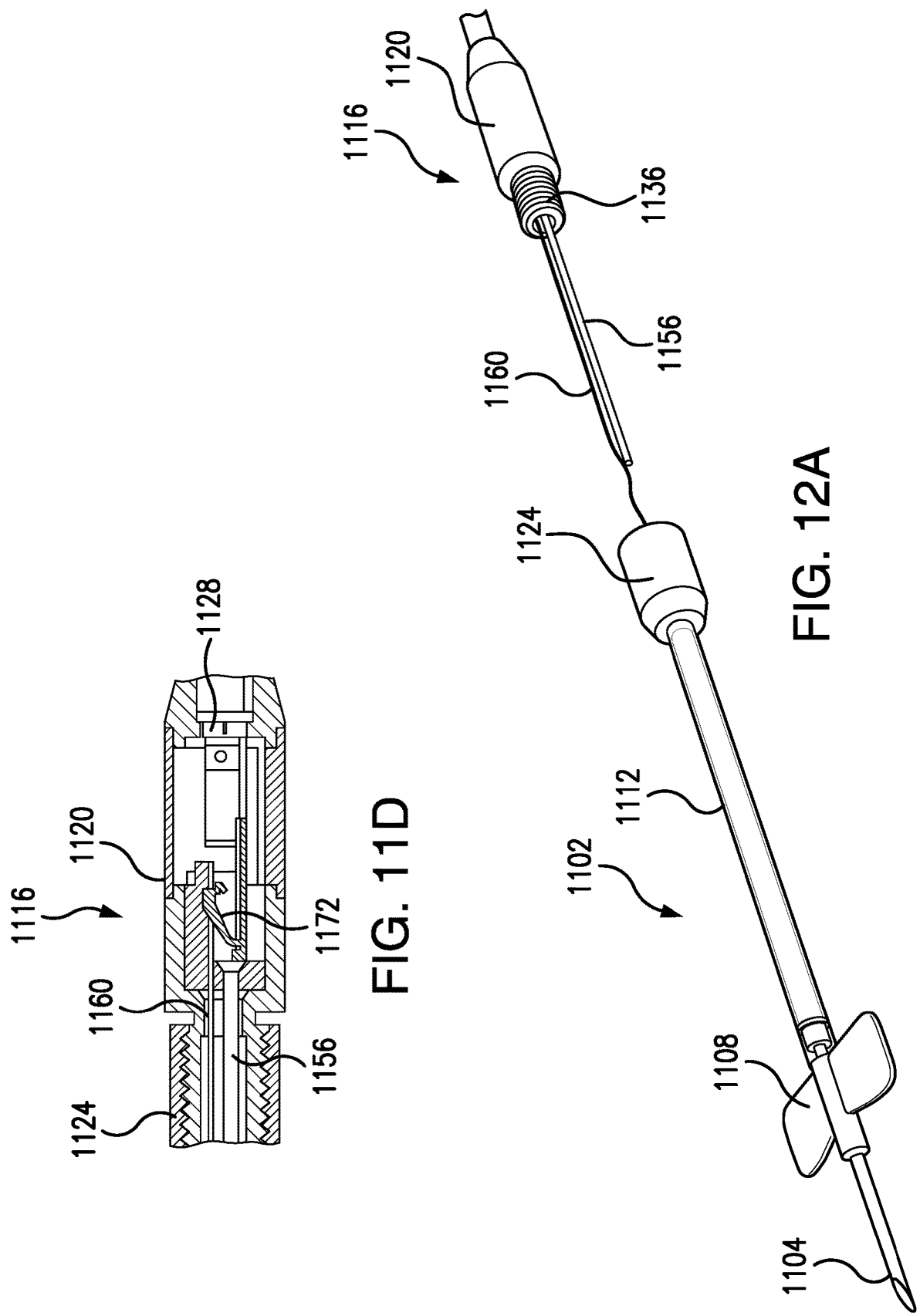

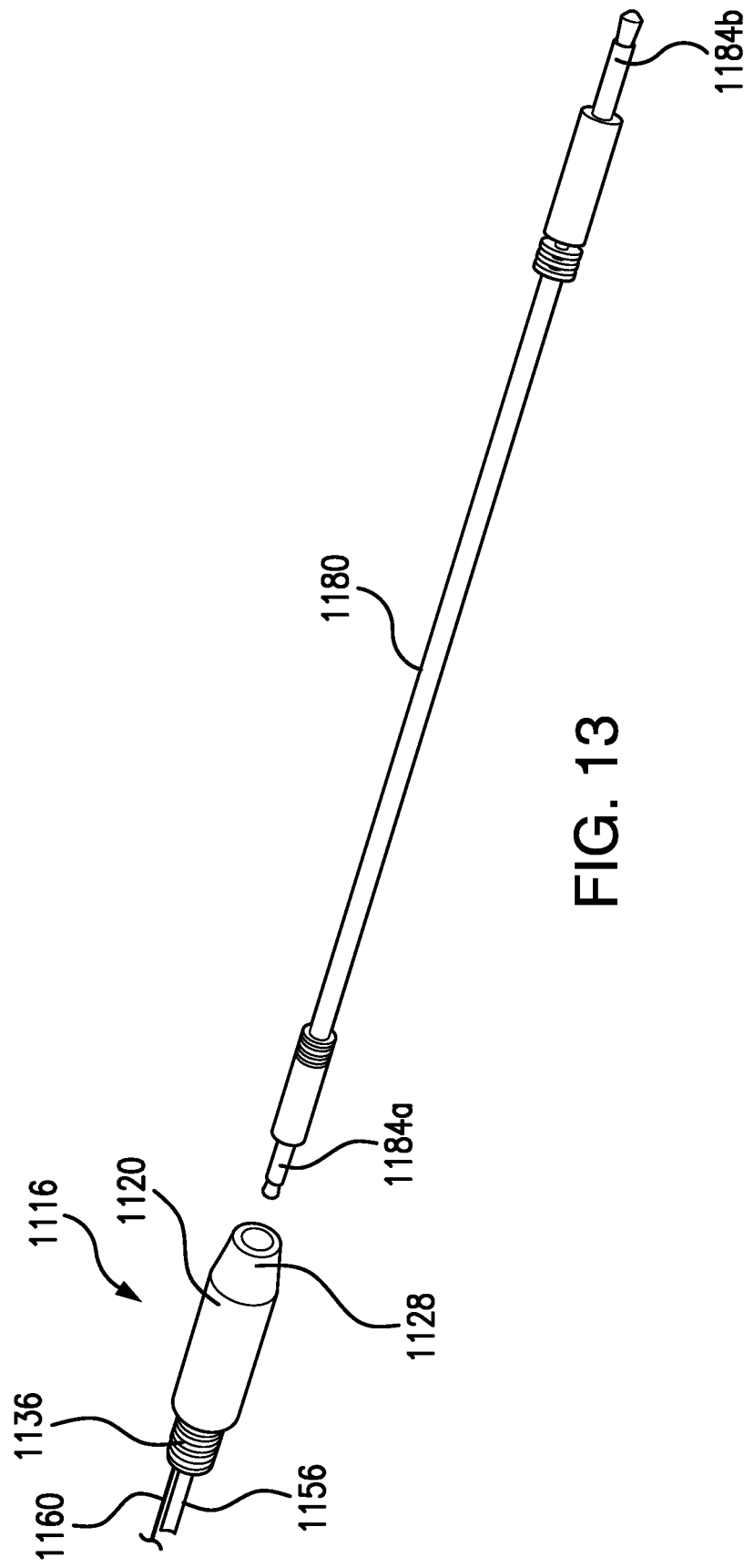

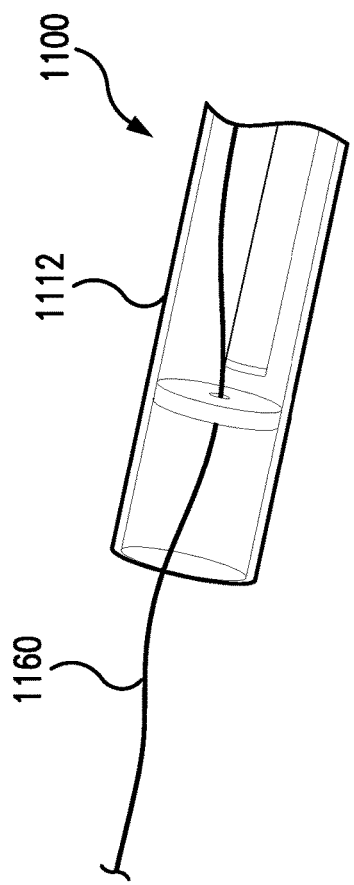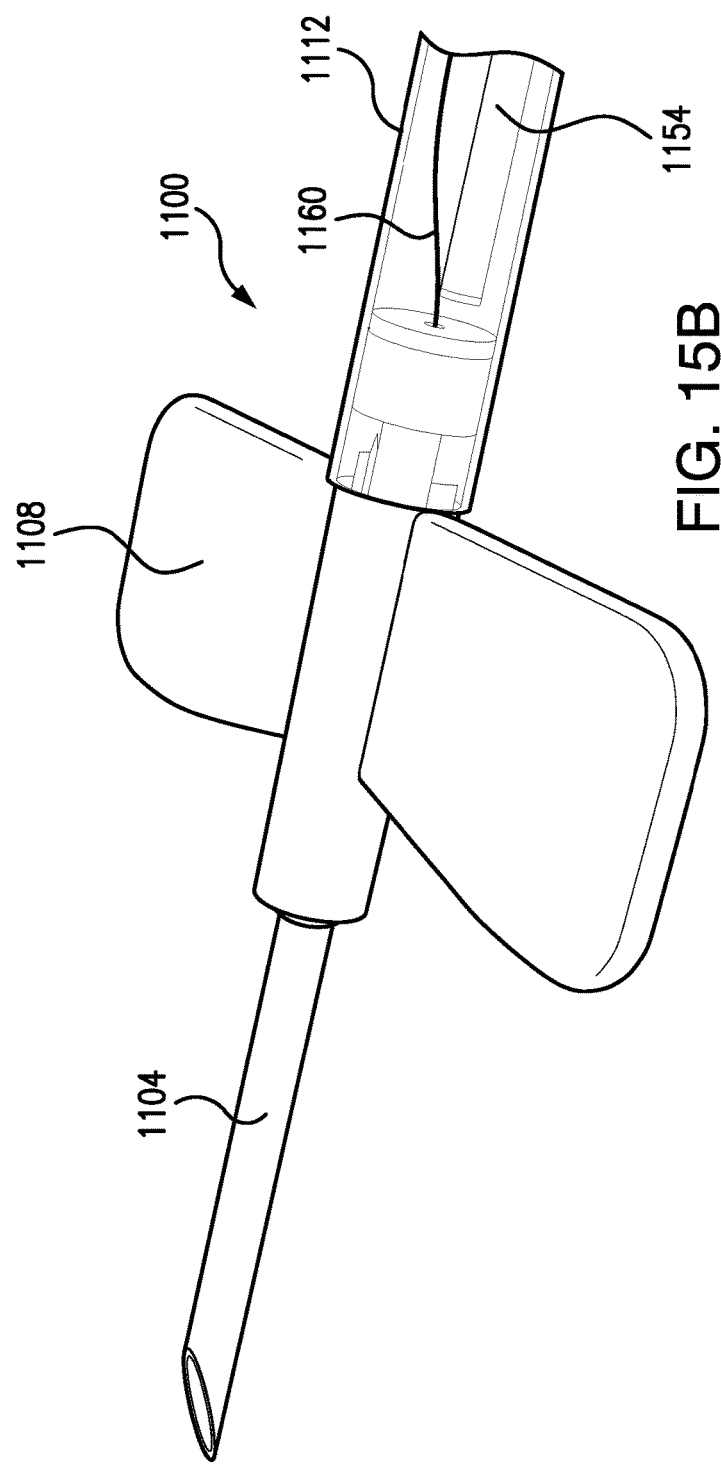

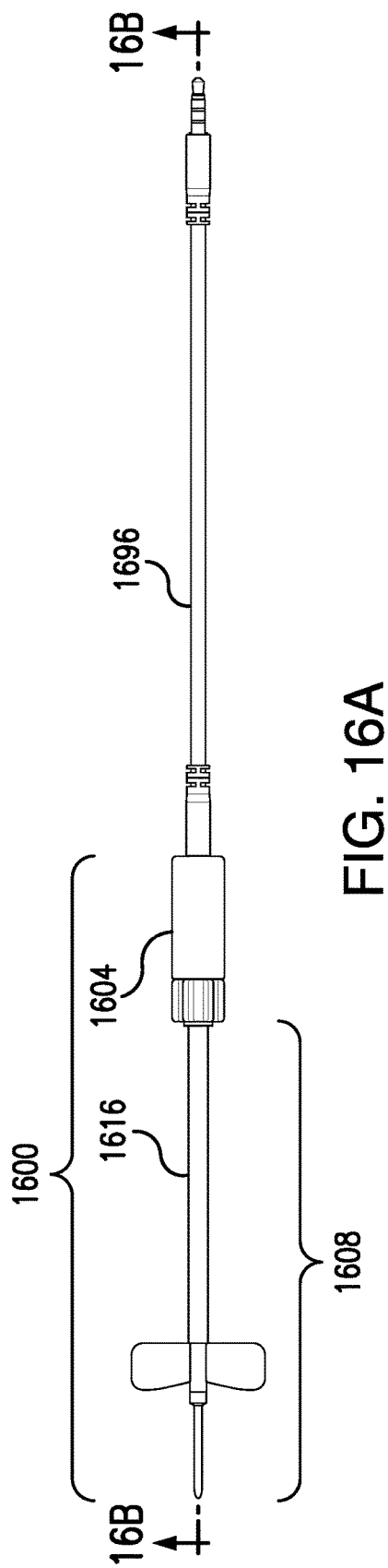
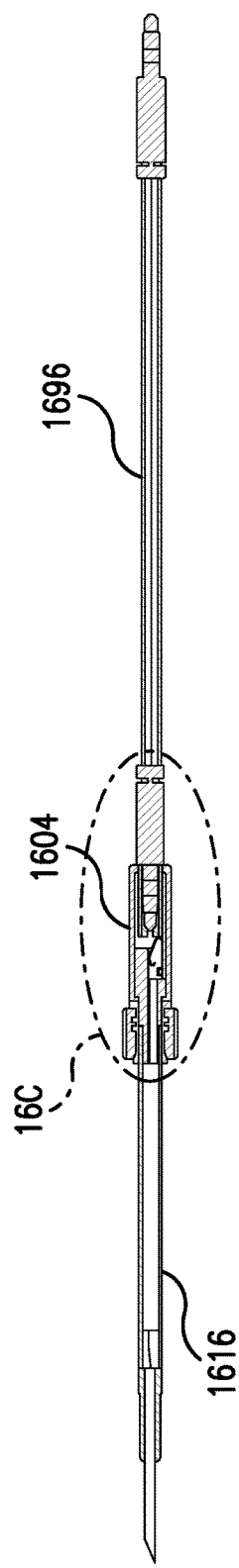
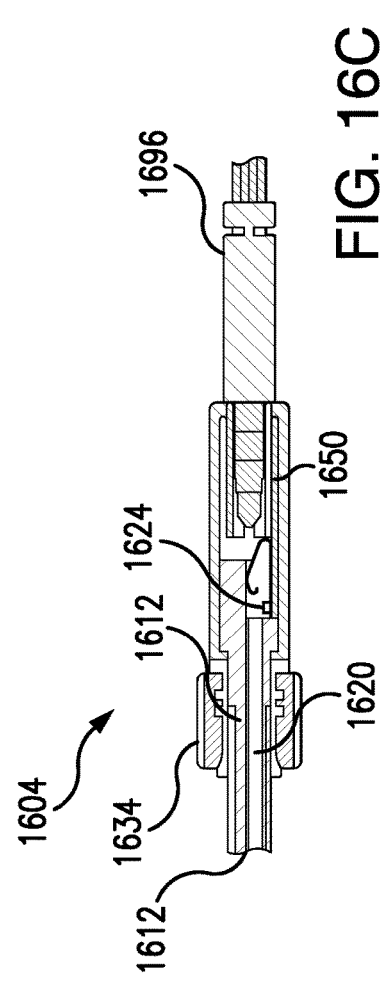

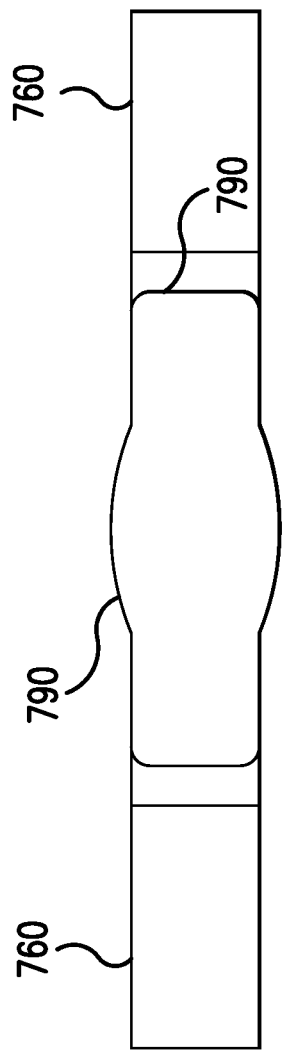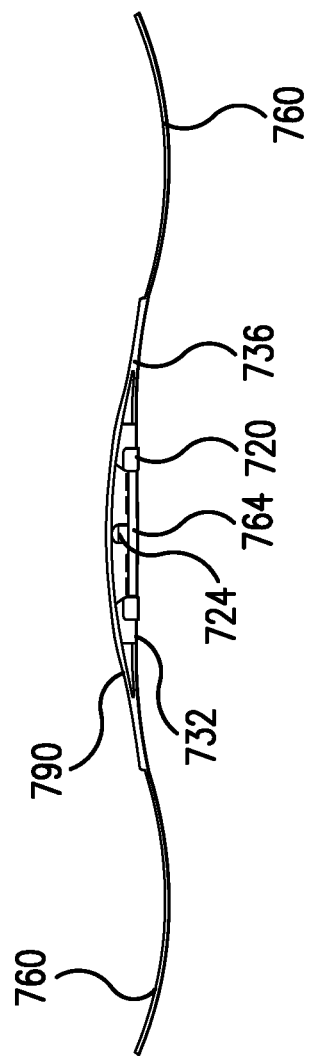

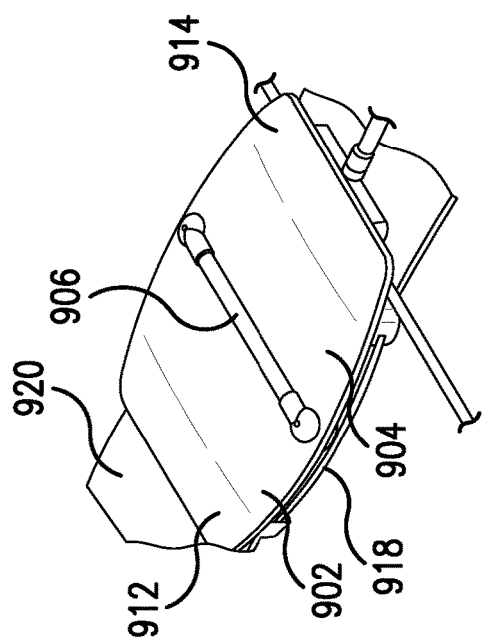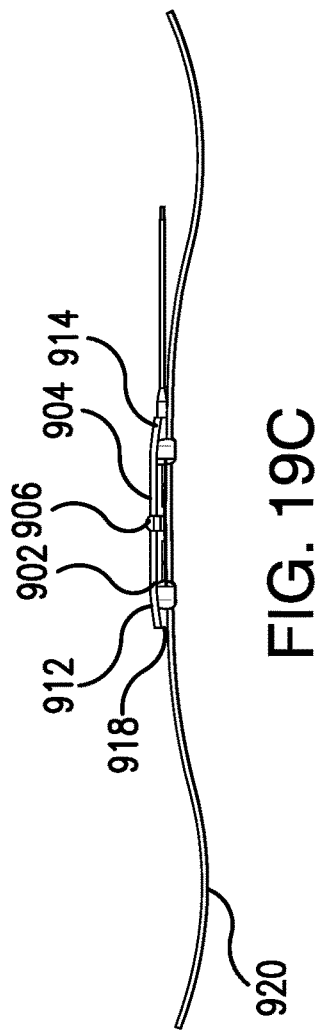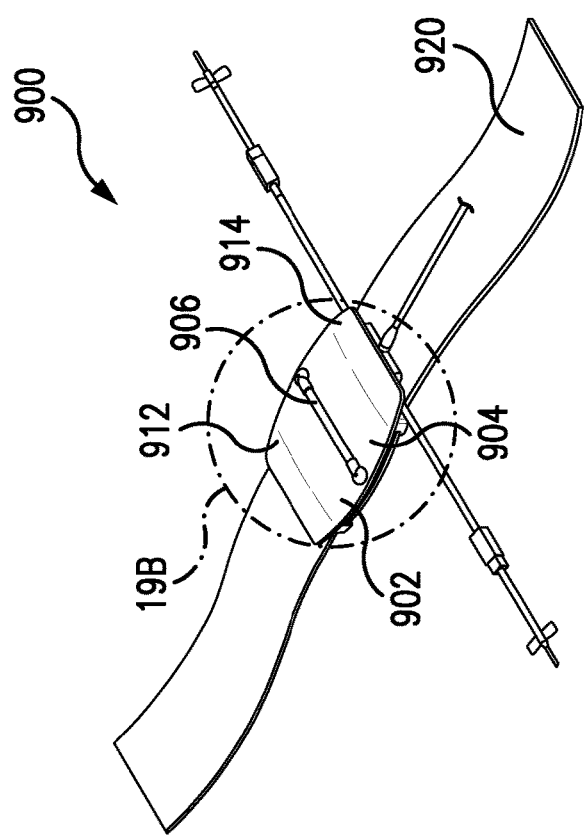

TRAINING PROSTHETIC FOR SELF-CANNULATION TRAINING

CROSS-REFERENCE TO RELATED APPLICATION

The present application is a continuation-in-part application of, and claims priority from, Patent Cooperation Treaty (PCT) Application No. PCT/US2021/053876 filed Oct. 7, 2021, which in-turn claims priority to U.S. patent application Ser. No. 17/082,573, filed Oct. 28, 2020, both of which are incorporated herein in their entireties by reference.

FIELD OF THE INVENTION

The present invention relates to a training system and method for learning and practicing self-cannulation as would be needed for home hemodialysis patients.

BACKGROUND OF THE INVENTION

Self-cannulation is a huge hurdle for patients to overcome when moving into the arena of home hemodialysis. Self-cannulation is a stressful process that can take weeks or months to achieve and master. A need exists for a device that can help augment a training regimen for self-cannulation and help a patient to achieve self-cannulation sooner than would be achieved with traditional training methods. A need also exists for a training method that enables a home hemodialysis trainee to build confidence and muscle memory prior to a first real self-cannulation experience.

SUMMARY OF THE INVENTION

An objective of the present invention is to provide a training opportunity for self-cannulation as a means of building confidence and developing muscle memory prior to actual self-cannulation for home hemodialysis patients. This and other objectives are achieved according to the present invention by using the modular training system described herein. The system provides a device that produces a realistic "flash" of blood-like fluid in a simulated cannula upon proper cannulation. The system provides tactile feedback if the simulated access is improperly cannulated or infiltrated during cannulation. The system provides realistic skin-like material on outermost layers to create an illusion and feel as though the user is cannulating their own appendage. The system provides adjustable anchor-points for the simulated access to mimic a planned, existing, or potential access location and configuration in the patient's body. The system uses materials for and in the simulated access to give a trainee a realistic sensation and pressure when the simulated cannula needle is inserted into the simulated access.

The modular system can include a synthetic skin covering or overlay, for example, a layer of replaceable synthetic skin or fabric that can be anchored to other system components as a covering. The simulated skin covering can exhibit a correct resistance to puncturing by the simulated cannula needle, a material that enables a trainee or user to discern the position of a simulated access underneath the simulated skin covering, a correct skin-like stretching and movement, combinations thereof, and the like. The simulated skin covering can comprise a material that enables a trainee or user to see a bulge, highlights, and shadows caused by an underlying simulated access so that the trainee or user can visibly identify where the simulated access is located underneath the simulated skin covering. The simulated skin covering can exhibit a skin tone color to match the skin color of the trainee.

The simulated access can be made from actual graft material, or a reasonable facsimile, to produce a realistic cannulating experience. The simulated cannula can comprise flexible conductive wires and can mimic standard hemodialysis cannulation needles. The cannulation pad can comprise an underlying, protective, highly puncture-resistant layer, anchor, or shielding that prevents a trainee or user from stabbing himself or herself. The system can include a flexible adjustable armband in the form of a stretchy closable band that wraps around a trainee's appendage enabling the trainee to attach the modular system components to the trainee's appendage. Although many embodiments described herein exemplify the system being used on a forearm, it is to be understood that embodiments of the invention are also provided for using the system on a leg or on other parts of a body, which might be viable for hemodialysis cannulation for a particular trainee.

According to the present invention, a self-cannulation training system is provided that comprises a cannulation pad, a simulated access, a simulated cannula, a control unit, and at least one indicator. The cannulation pad comprises a cannulation electrical circuit conductor, an infiltration electrical circuit conductor, and an insulating layer electrically insulating the cannulation electrical circuit conductor from the infiltration electrical circuit conductor. The simulated access is configured to be electrically connected to the cannulation electrical circuit conductor and comprises an outer sheath and an electrically conductive material retained inside the sheath. The simulated cannula has a length and comprises a cannulation needle at a first end thereof, a cannula connector at a second, opposite end thereof, and an electrical conductor extending along the length and electrically connecting the cannulation needle with the cannula connector. The control unit comprises a power source and an electrical connector for connecting the power source to both the cannulation electrical circuit conductor and to the infiltration electrical circuit conductor. The control unit also has a second electrical connector for connecting the power source to the cannula connector of the simulated canula.

According to exemplary embodiments, the indicator is in electrical contact with the electrical conductor and is configured to be activated when the cannula needle electrically contacts the cannulation electrical circuit conductor to form a completed cannulation electrical circuit. The second indicator can be different than the first indicator and can be in electrical contact with the electrical conductor of the simulated cannula. The second indicator can be configured to be activated when the cannula needle electrically contacts the infiltration electrical circuit conductor to complete an infiltration electrical circuit. The first indicator can be, for example, a red LED and can signal that a proper cannulation of the simulated cannula into the simulated access, has taken place. The second indicator can be, for example, a buzzer and can indicate when an infiltration has taken place.

The system can include modular, replaceable, interchangeable components that can include, for example, an armband and wrist band, an arm cradle, a pair of simulated cannulas, a simulated skin covering, a replaceable battery, or a combination thereof. By using the training system, a method of training a patient or trainee for self-cannulation can be provided according to the present invention.

The training method of the present invention can comprise mounting the cannulation pad on the trainee or on a different person or dummy for the purpose of training a trainee. For example, the cannulation pad can be mounted on an armband worn by the trainee himself or herself. Alternatively, the trainee, helper, or dummy can have an arm placed inside the arm cradle and the cannulation pad can be mounted on the arm cradle. The cannulation pad can be a cannulation pad as described herein and can comprise a cannulation electrical circuit conductor, an infiltration electrical circuit conductor, and an insulating layer electrically insulating the cannulation electrical circuit conductor from the infiltration electrical circuit conductor. The method can involve electrically connecting a simulated access to the cannulation electrical circuit conductor. The method can involve electrically connecting a power source to both the cannulation electrical circuit conductor and to the infiltration electrical circuit conductor. The method can involve electrically connecting the power source to a simulated cannula. The simulated cannula can be a simulated cannula as described herein and can have a length, a cannulation needle at a first end, a cannula connector at a second, opposite end, and an electrical conductor extending along the length and electrically connecting the cannulation needle with the cannula connector. The cannula connector can be electrically connected to the power source. The method can comprise having the trainee insert the cannulation needle into a simulated access to train for inserting a real cannulation needle into a real access. The simulated access can be a simulated access as described herein and can comprise an outer sheath and an electrically conductive material retained inside the sheath. By practicing artificial cannulation using the training system, a trainee can become proficient at self-cannulation and be better prepared to perform true cannulation into an access or fistula when the time comes.

Methods of manufacturing the modular training system described herein are also provided and can include preparing an electrically conductive gel for filling the electrically conductive simulated access. Preparing the electrically conductive gel can comprise mixing together borax, glue, salt, and water. Preparing the cannulation pad can involve assembling together the various pad layers and components shown and described herein.

BRIEF DESCRIPTION OF THE DRAWINGS

The invention may be more fully understood with reference to the accompanying drawings. The drawings are intended to illustrate, not limit, the present teachings.

FIG. 11A is a side view of a simulated cannula, according to various embodiments of the present invention.

FIG. 11B is a top view of the simulated cannula shown in FIG. 11A.

FIG. 11C is a side view of the simulated cannula, shown in FIGS. 11A and 11B, showing in partial cutaway a needle coupler assembly.

FIG. 11D is an enlarged view of section 11D, taken from FIG. 11C.

FIG. 12A is a top perspective view of a replaceable needle assembly and a needle coupler assembly, according to various embodiments of the present invention, prior to assembly.

FIG. 13 is a top perspective view of a needle coupler assembly and a connecting cable, according to various embodiments of the present invention, disconnected from one another.

FIG. 15A is an enlarged view of a wave-shaped electrical conductor in and extending out from the end of a transparent, hollow, flexible tube of a simulated cannula, according to various embodiments of the present invention.

FIG. 15B is a top perspective view of the wave-shaped electrical conductor and hollow flexible tube shown in FIG. 15A, after assembly to a needle and set of wings, to form a simulated cannula according to various embodiments of the present invention.

FIG. 16A is a top plan view of a simulated cannula including a coupler, according to another embodiment of the present invention, connected to a connector cable.

FIG. 16B is a side cross-sectional view of the simulated cannula with connector cable shown in FIG. 16A, taken along line 16B-16B.

FIG. 16C is an enlarged view of section 16C shown in FIG. 16B.

FIG. 18A is a plan view of a training prosthetic for self-cannulation training, according to an embodiment of the present invention, including the training prosthetic shown in FIG. 17 with a simulated skin covering attached thereto.

FIG. 18B is a side view of the training prosthetic for self-cannulation training, shown in FIG. 18A.

FIG. 19A is a top perspective view of a training prosthetic for self-cannulation training, according to another embodiment of the present invention, that does not include a simulated skin covering.

FIG. 19B is an enlarged view of section 19B taken from FIG. 19A, and showing leveling patches adjacent the simulated access.

FIG. 19C is a side view of the training prosthetic for self-cannulation training, shown in FIGS. 19A and 19B.

DETAILED DESCRIPTION OF THE INVENTION

Figure 1:
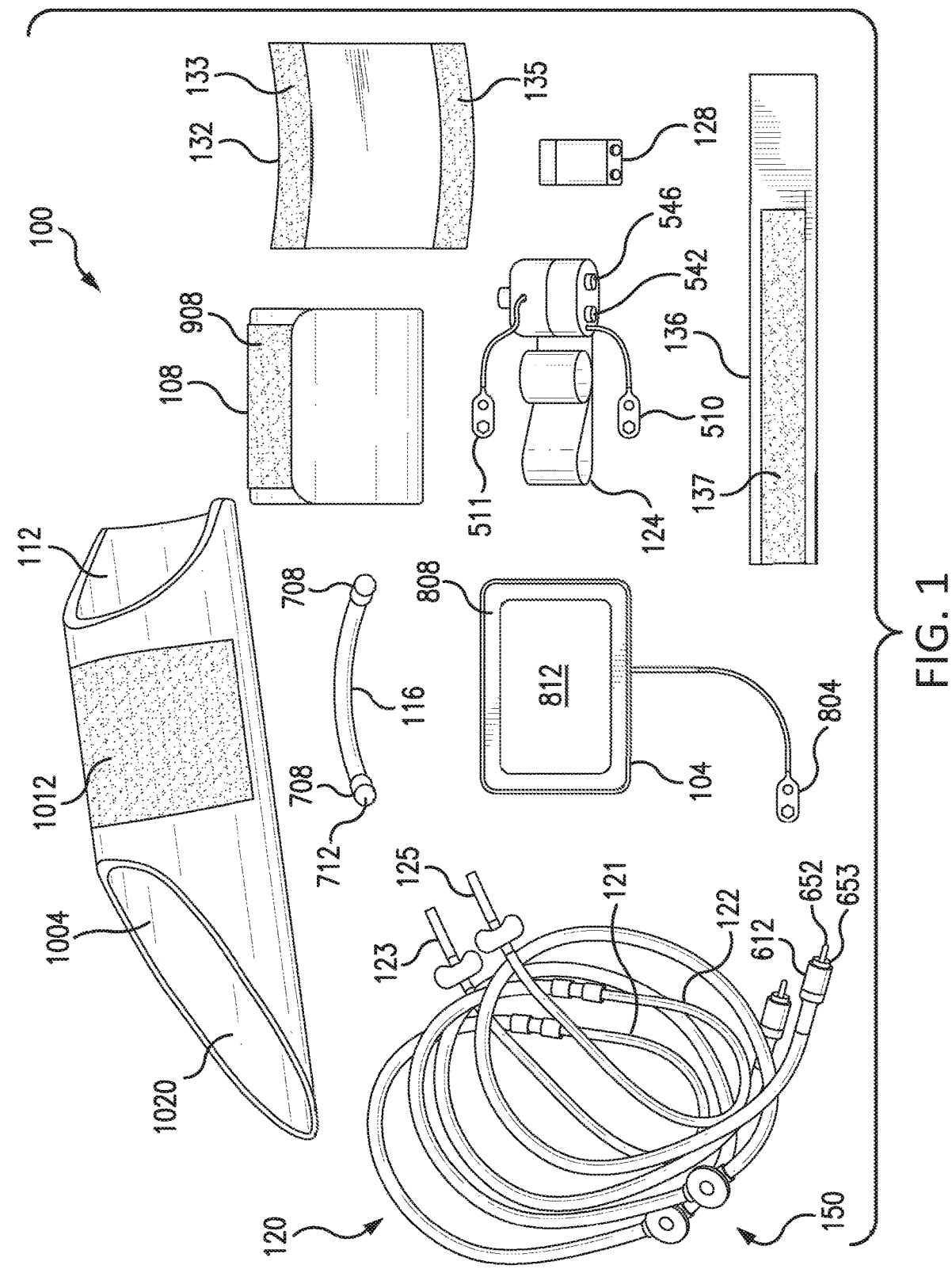
FIG. 1 is a schematic top view of a modular self-cannulation training system according to an embodiment of the present invention.

The present invention provides a self-cannulation training system to enable patients, such as hemodialysis patients, to learn how to self-cannulate. The system comprises a cannulation pad, a simulated access, a simulated cannula, and a control unit. The cannulation comprises a cannulation electrical circuit conductor, an infiltration electrical circuit conductor, and an insulating layer electrically insulating the cannulation electrical circuit conductor from the infiltration electrical circuit conductor. The simulated access is configured to be electrically connected to the cannulation electrical circuit conductor. The simulated access comprises an outer sheath and an electrically conductive material retained inside the sheath. The electrically conductive material can be, for example, an electrically conductive gel. The simulated cannula has a length, a cannulation needle at a first end thereof, and a cannula connector at a second, opposite end thereof. An electrical conductor is provided extending along the length of the simulated cannula and electrically connects the cannulation needle with the cannula connector. The electrical conductor of the simulated cannula can be shielded. The electrical conductor can comprise, for example, a co-axial cable and the cannula connector can comprise an RCA cable connector. The control unit can comprise electrical circuitry, cable connectors, a power source, or a combination thereof. The cable connectors of the control unit can be shielded, co-axial, a combination thereof, or the like. The cable connectors of the control unit can be RCA cable connectors or the like.

The control unit can include a first electrical connector for connecting the power source to the cannulation electrical circuit conductor. The control unit can include a second electrical connector for connecting the power source to the infiltration electrical circuit conductor. The first and second connectors can be the same or different connectors. Another connector can be provided for connecting the control unit, the power source, or both, to the cannula connector.

To provide a patient with feedback during training, a first indicator can be provided in electrical contact with the electrical conductor. The first indicator can be configured to be activated when the cannula needle properly electrically contacts the conductive material retained inside the simulated access when the simulated access is in electrical connection with the cannulation electrical circuit conductor. As such, the system can be configured such that the cannula needle completes and forms a cannulation electrical circuit. The first indicator can be, for example, a light, a flashing light, a red light, an LED, a vibrator, a sound generator, a combination thereof, or the like.

A second indicator, different than the first indicator, can also be provided in electrical contact with the electrical conductor. The second indicator can be configured to be activated when the cannula needle misses or passes through the simulated access and electrically contacts the infiltration electrical circuit conductor. The system can be configured such that, in such an event, the cannula needle completes and forms an infiltration electrical circuit. The second indicator can be, for example, a light, a flashing light, a red light, an LED, a vibrator, a sound generator, a combination thereof, or the like. As an example, the first indicator can comprise a light indicator and the second indicator can comprise a vibrator, a sound alarm, or a combination thereof. The first indicator can comprise a red-light-emitting diode.

The self-cannulation training system can further comprise a second simulated cannula. The second simulated cannula has a length and can comprise a second cannulation needle at a first end thereof, a second cannula connector at a second, opposite end thereof, and a second electrical conductor extending along the length. The second electrical conductor can electrically connect the second cannulation needle with the second cannula connector. The second electrical conductor of the second simulated cannula can be shielded and can comprise a co-axial cable and the second cannula connector can comprise an RCA cable connector.

The simulated access can be electrically connected to the cannulation electrical circuit conductor or can be configured to be electrically connected to the cannulation electrical circuit conductor, for example, electrically connected using magnets. According to various embodiments, a first electrical connector can connect the power source to both the cannulation electrical circuit conductor and to the infiltration electrical circuit conductor, and a second electrical connector can connect the power source to the cannula connector.

To connect the cannulation pad to a patient, for example, to a forearm of a patient, armband can be used and can be provided as part of the system. The armband and the cannulation pad can be configured to be fastened together. A simulated skin covering can also be provided and the armband and the simulated skin covering can be configured to be fastened together, for example, with the simulated access being positioned in between. The simulated access can be positioned to be made in electrical contact with the cannulation electrical circuit conductor before the simulated access is covered by the simulated skin covering.

The simulated skin covering can exhibit a correct resistance to puncturing by the simulated cannula needle, a material that enables a trainee or user to discern the position of a simulated access underneath the simulated skin covering, a correct skin-like stretching and movement, combinations thereof, and the like. The simulated skin covering can comprise a material that enables a trainee or user to see a bulge, highlights, and shadows caused by an underlying simulated access so that the trainee or user can visibly identify where the simulated access is located underneath the simulated skin covering. The simulated skin covering has an outer surface and the outer surface can have a skin tone color, for example, tan, beige, brown black, peach, or the like. The skin tone color of the simulated skin covering can be selected to match the skin color of the patient. The outer surface can be made of a material similar to artificial human skin, for example, a material that is able to give and stretch consonant with the other components and layers. The outer surface can serve the cosmetic purpose of looking like real human skin. A skin tone color can be selected to different patient populations. Moles, freckles, tattoos, scars, combinations thereof, and the like can be added to the outside surface to replicate a particular skin and individual.

The training system can also comprise a wrist band. The wrist band and the control unit can be configured to be fastened together. The wrist band can comprise a fastener, for example, a fastener patch including at least one of hook fasteners and loop fasteners. The control unit can comprise a fastener, for example, a fastener patch including at least one of hook fasteners and loop fasteners. The fastener of the wrist band and the fastener of the control unit can be complementary to each other. The wrist band can comprise a pocket, a strap, or the like, for accommodating the power source, such as a battery pocket for accommodating a battery.

Instead of or in addition to an arm band, the self-cannulation training system can further comprise an arm cradle. The arm cradle can be, for example, tubular in shape and can have a through-hole for accommodating an arm. The arm cradle and the cannulation pad can be configured to be fastened together. The arm cradle can comprise a fastener, for example, a fastener patch including at least one of hook fasteners and loop fasteners. The cannulation pad can comprise a fastener, for example, a fastener patch including at least one of hook fasteners and loop fasteners. The arm cradle and the control unit can be configured to be fastened together. The arm cradle can comprise a second fastener patch including at least one of hook fasteners and loop fasteners, and the control unit can comprise a fastener patch including at least one of hook fasteners and loop fasteners. The arm cradle can comprise a plastic material, such as polyvinylchloride (PVC). The arm cradle can be wrapped with a fabric, rubber, textile, or elastomeric material, for example, wrapped with a NEOPRENE® material, NEOPRENE® being a registered trademark of DuPont Company, Wilmington, Delaware.

For the hook and loop fasteners described herein, VELCRO® (available from Velcro BVBA, Deinze, Belgium) can be used. Each of the simulated skin covering, wrist band, armband, cradle cover, cannulation pad, and simulated access can independently comprise any suitable material. Exemplary materials that can be used include cotton, linen, spandex, polyester, rayon, nylon, ragadon, elastone, modal, silk, satin, leather, LYCRA® (E. I. DU PONT DE NEMOURS AND COMPANY, Wilmington, Delaware), bamboo, hemp, dry-fit materials, wicking materials, breathable materials, blends of such materials, and the like materials. Organic materials can be used. The material can be comfortable. As an example, the material can comprise cotton, polyester, nylon, spandex, LYCRA®, a foamed NEOPRENE® material, a textile material, a blend of materials, a cotton-polyester blend material, a nylon-spandex blend material, or the like. As a further example, the material can comprise at least one of a nylon-spandex blend material and a foamed NEOPRENE® material. The material can comprise a stretchable material.

The electrically conductive material of the simulated access can comprise an electrically conductive material, for example, a liquid, gel, polymer, suspension, emulsion, dispersion, or the like. The electrically conductive material can be a gel, for example, a an electrically conductive gel comprising the reaction product of borax, glue, salt, and water. Sodium chloride or other salts can be used. The outer sheath of the simulated access can comprise a self-sealing material. GORE-TEX® (W. L. Gore & Associates, Inc., Newark, Delaware) can be used. Septa material as are used in self-sealing, resealing caps for vials of liquids, can be used.

The present invention also provides a method of training a patient for self-cannulation. The method involves mounting a cannulation pad on the patient. The patient can mount the cannulation pad or someone else. The cannulation pad can be a pad as described herein, for example, including a cannulation electrical circuit conductor, an infiltration electrical circuit conductor, and an insulating layer electrically insulating the cannulation electrical circuit conductor from the infiltration electrical circuit conductor. The method can further involve electrically connecting a simulated access to the cannulation electrical circuit conductor. The simulated access can be, for example, as described herein. The simulated access can comprise an outer sheath and an electrically conductive material retained inside the sheath. The method can involve, but is not limited to, electrically connecting a power source to both the cannulation electrical circuit conductor and to the infiltration electrical circuit conductor. The method can involve, but is not limited to, electrically connecting the power source to a simulated cannula, for example, a simulated cannula as described herein. The simulated cannula has a length and can comprise a cannulation needle at a first end thereof, a cannula connector at a second, opposite end thereof, and an electrical conductor extending along the length. The electrical conductor can electrically connect the cannulation needle with the cannula connector. The cannula connector can already be electrically connected to the power source or the method can involve connecting the cannula connector to the power source. The method can involve of be limited to having the patient insert the cannulation needle into the simulated access to train the patient for inserting a real cannulation needle into a real access of the patient, e.g., to carry out a self-cannulation. The method can also help train others how to carry out a cannulation of the patient.

According to the method, the patient can receive feedback about the self-cannulation carried out. For example, when the patient inserts the cannulation needle into the simulated access such that a distal tip of the cannulation needle rests inside the access, a first indicator is activated to indicate that a proper cannulation into the simulated access has been achieved. For example, if the insertion results in a positioning of the needle that enables an unrestricted fluid communication between the interior of the simulated access and an opening at the distal tip of the needle, the first indicator is activated.

The method can involve providing feedback in the form of signaling a fault, error, or alarm, when the cannulation does not result in a proper positioning of the tip of the needle. For example, when the patient inserts the cannulation needle into the cannulation pad such that the distal tip of the cannulation needle contacts the infiltration electrical circuit conductor, a second indicator can be activated to indicate that an improper cannulation into the simulated access has resulted. The first indicator can comprise a red light, for example, a red-light emitting LED. The second indicator can comprise, for example, a vibrator or sound-generator.

The method can involve mounting the cannulation pad on the patient. The mounting can comprise fastening an arm band to a forearm of the patient. The method can involve fastening the cannulation pad to the arm band. Mounting the cannulation pad on the patient can comprise placing a forearm of the patient into an arm cradle. The method can involve fastening the cannulation pad to the arm cradle. The method can involve fastening a simulated skin covering over the simulated access before inserting the cannulation needle into the simulated access. The method can involve selecting a skin tone color that matches the skin tone of the patient.

With reference now to the drawings, FIG. 1 is a schematic top view of a modular self-cannulation training system 100 according to an embodiment of the present invention. Modular self-cannulation training system 100 comprises a cannulation pad 104, an armband 108, an arm cradle 112, a simulated access 116, a set 120 of simulated cannulas 121, 122, a control unit 124, a battery 128, a simulated skin covering 132, and a wrist band 136. As can be seen from the top view shown, cannulation pad 104 includes a cannulation electrical circuit conductor 808 in the form of a frame, and an insulator layer 812 separating cannulation electrical circuit conductor 808 from underlying components. More details of cannulation pad 104 are shown in, and described in connection with, FIG. 8 of PCT Application No. PCT/US2021/053876, filed Oct. 7, 2021, which is incorporated herein in its entirety by reference. A two-terminal electrical connector 804 can be used to electrically connect cannulation pad 104 to a two-terminal electrical connector 510 of control unit 124. A second two-terminal electrical connector 511 is provided to connect control unit 124 to battery 128. More details of control unit 124 are shown in, and described in connection with, FIGS. 5 and 11 of PCT Application No. PCT/US2021/053876, filed Oct. 7, 2021, which is incorporated herein in its entirety by reference.

Simulated access 116 includes a stack of magnets 712 at each end thereof and left and right magnet housings 708 for respectively housing stacks of magnets 712. More details of simulated access 116 are shown in, and described in connection with, FIGS. 7A and 7B of PCT Application No. PCT/US2021/053876, filed Oct. 7, 2021. Simulated cannulas 121 and 122 can comprise a simulated arterial cannula and a simulated venous cannula. Cannula needles at the tips of simulated cannulas 121 and 122, are protected by needle sheaths 123 and 125, respectively. Each of simulated cannulas 121 and 122 terminates at an RCA jack, for example, male RCA connector 612 having a connector post 652 and a cup-shaped metal conductor 653. Suction cups 150 are provided for attaching simulated cannulas 121 and 122 to a trainee's skin or to another surface and can be color-coded, for example, red for the simulated arterial cannula and blue for the simulated venous cannula. More details of simulated cannula 121 are shown in, and described in connection with, FIGS. 6 and 11 of PCT Application No. PCT/US2021/053876, filed Oct. 7, 2021.

Armband 108 can comprise a sleeve configuration through which a trainee's arm can pass. Armband 108 can comprise a longitudinal opening or access so that armband 108 can be pushed onto an arm. One or more hook or loop or other fastener material patches 908 can be provided so that other modular components of the system can be fastened to and retained by armband 108. More details of armband 108 are shown in, and described in connection with, FIGS. 3 and 9 of PCT Application No. PCT/US2021/053876, filed Oct. 7, 2021.

Arm cradle 112 can comprise a tube 1004 covered on its inside surface with a NEOPRENE® or other elastomeric material 1020 intended to make contact with the skin of a trainee's arm. An outer surface of arm cradle 112 can also be coated or wrapped with a NEOPRENE® or other elastomeric material. Outer surface 1008 can include a wide patch 1012 of hook fasteners configured to fasten and retain a cannulation pad such as cannulation pad 104 shown in FIG. 1. More details of arm cradle 112 are shown in, and described in connection with, FIGS. 4 and 10 of PCT Application No. PCT/US2021/053876, filed Oct. 7, 2021.

Simulated skin covering 132 can be used to cover simulated access 116 and attach to armband 108 or arm cradle 112 so as to mimic an access or fistula of the trainee, under the surface of trainee's skin. Simulated skin covering 132 can comprise first and second fastener patches 133 and 135 that can be, for example, in the form of loop fastener patches adapted to fasten simulated skin covering 132 to armband 108 or arm cradle 112 and retain simulated skin covering thereon.

Wrist band 136 is provided with a fastener patch 136 that can be, for example, in the form of a loop fastener patch or a hook fastener patch adapted to fasten wrist band 136 around the wrist of a trainee or other user and configured to fasten and retain a control unit, battery, or both, to wrist band 136. Wrist band 136 can be used together with armband 108, in some embodiments.

Figure 2:
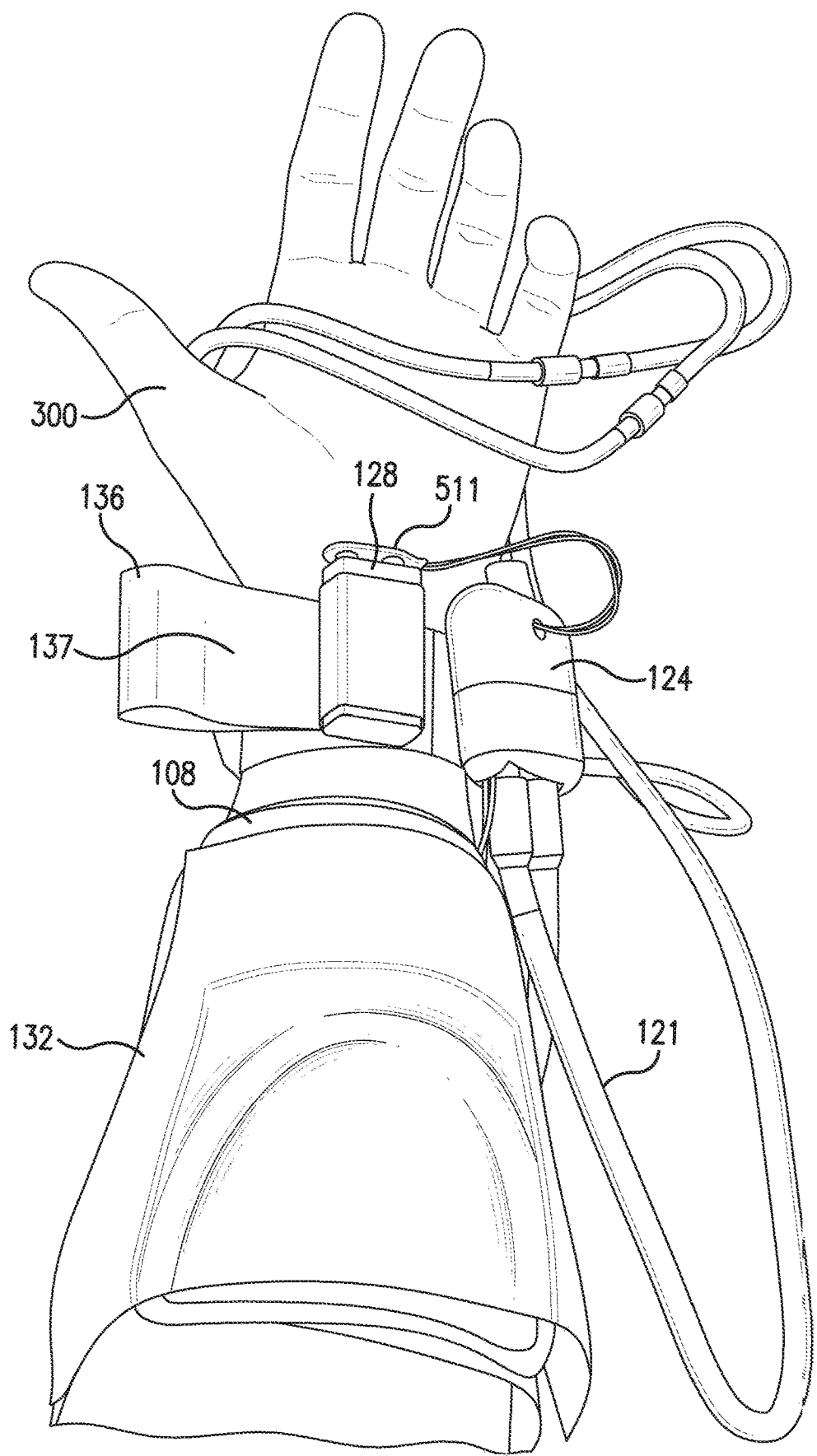
FIG. 2 is a top view of the modular system shown in FIG. 1, assembled, on an arm of a trainee, and further including a power source and two simulated cannulas connected to the control unit.

FIG. 2 is a top view of the modular system shown in FIG. 1, assembled, on an arm of a trainee, and further including a power source in the form of battery 128, connected to two-terminal connector 511, and wherein control unit 124 is also connected to two simulated cannulas including cannula 121. As can be seen in FIG. 2, control unit 124 is fastened to wrist band 136, on fastener strip 137, and simulated skin covering 132 covers simulated access 116 so it appears as, or mimics, a bulging fistula on the arm of a trainee 300.

Figure 3:
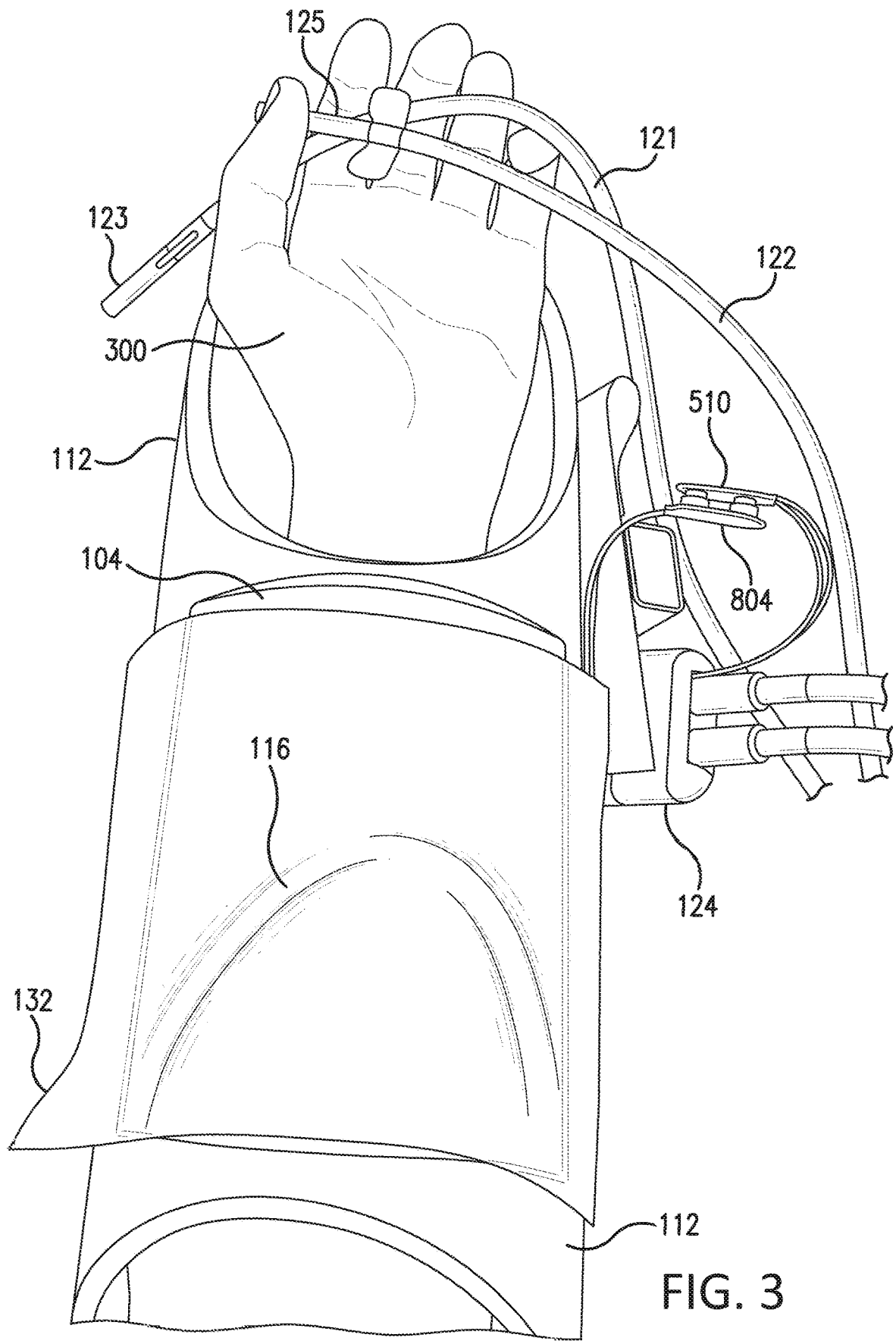
FIG. 3 is a top view of a modular system according to an embodiment of the present invention, assembled, on an arm of a trainee, and including the arm cradle shown in FIG. 1.

FIG. 3 is a top view of a modular system according to an embodiment of the present invention, assembled, on an arm of a trainee, and including arm cradle 112 shown in FIG. 1. In the embodiment shown in FIG. 3, arm cradle 112 is used. The arm of a trainee 300 is cradled in arm cradle 112. Cannulation pad 104 is fastened to a hook fastener patch on arm cradle 112 by a hook and loop fastener engagement. The bottom of cannulation pad 104 is fastened to arm cradle 112 via engagement of complementary hook and loop fasteners. other complementary fasteners and engagement devices can be used. Simulated access 116 can be magnetically secured to a cannulation electrical circuit conductor of cannulation pad 104. Simulated access 116 is covered by simulated skin covering 132 that is attached to arm cradle 112 via a hook and loop fastener engagement. At the training step shown in FIG. 3, trainee 300 is holding simulated cannulas 121 and 122 protective sheaths 123 and 125 remain covering and protecting the cannula needle tips of simulated cannulas 121 and 122, respectively. FIG. 3 also shows control unit 124 fastened to arm cradle 112 and retaining battery 128. As can be seen, control unit 124 is connected to cannulation pad 104 through the connection between connectors 510 and 804.

According to training methods provided herein, cannulation and self-cannulation can be practiced by cannulating simulated access 116 with a needle of a simulated cannula. For the cannulation pad, different layers can be assembled together with an insulator layer electrically separating a cannulation electrical circuit conductor from an infiltration electrical circuit conductor. The insulator layer can comprise a polymer, an elastomer, NEOPRENE®, or the like. An exemplary cannulation pad that can be used or that results from such assembling is shown as pad 104 in FIG. 1. Related useful and optional components, for example, those shown in and described in connection PCT Application No. PCT/US2021/053876, filed Oct. 7, 2021, can also be incorporated into the cannulation pad.

As described in PCT Application No. PCT/US2021/053876, filed Oct. 7, 2021, simulated access 116 can be electrically attached at one or both ends to a cannulation electrical circuit conductor, for example, to a top surface of the cannulation electrical circuit conductor. Simulated cannula 121 can be connected at a jack 612 to jack 542, connectors 510 and 804 can be connected together, and the needle of a simulated cannula can be used to cannulate simulated access 116. Simulated access 116 can comprise a tube filled with a conductive gel and having magnetic ends magnetically attached to and in electrical communication with cannulation electrical circuit conductor 808. Cannulation electrical circuit conductor 808 can comprise a metal frame, for example, a stainless steel or other metallic frame. Infiltration electrical circuit conductor can comprise a stainless steel or other metallic plate or frame, for example, a double-layer of aluminum foil.

Upon properly cannulating simulated access 116, a cannulation electrical circuit is formed such that electrical current runs through the entire cannulation electrical circuit including through LED in or optically communicating with the simulated cannula. As a result, the LED lights-up, signaling a proper cannulation. In the event that simulated access 116 is not properly cannulated by the needle, for example, via an overshoot through or by missing simulated access 116, and the needle contacts the infiltration electrical circuit conductor, a buzzer is activated signaling an improper cannulation, an infiltration, or both. The buzzer can be activated whether or not the LED is also activated.

Figure 4:
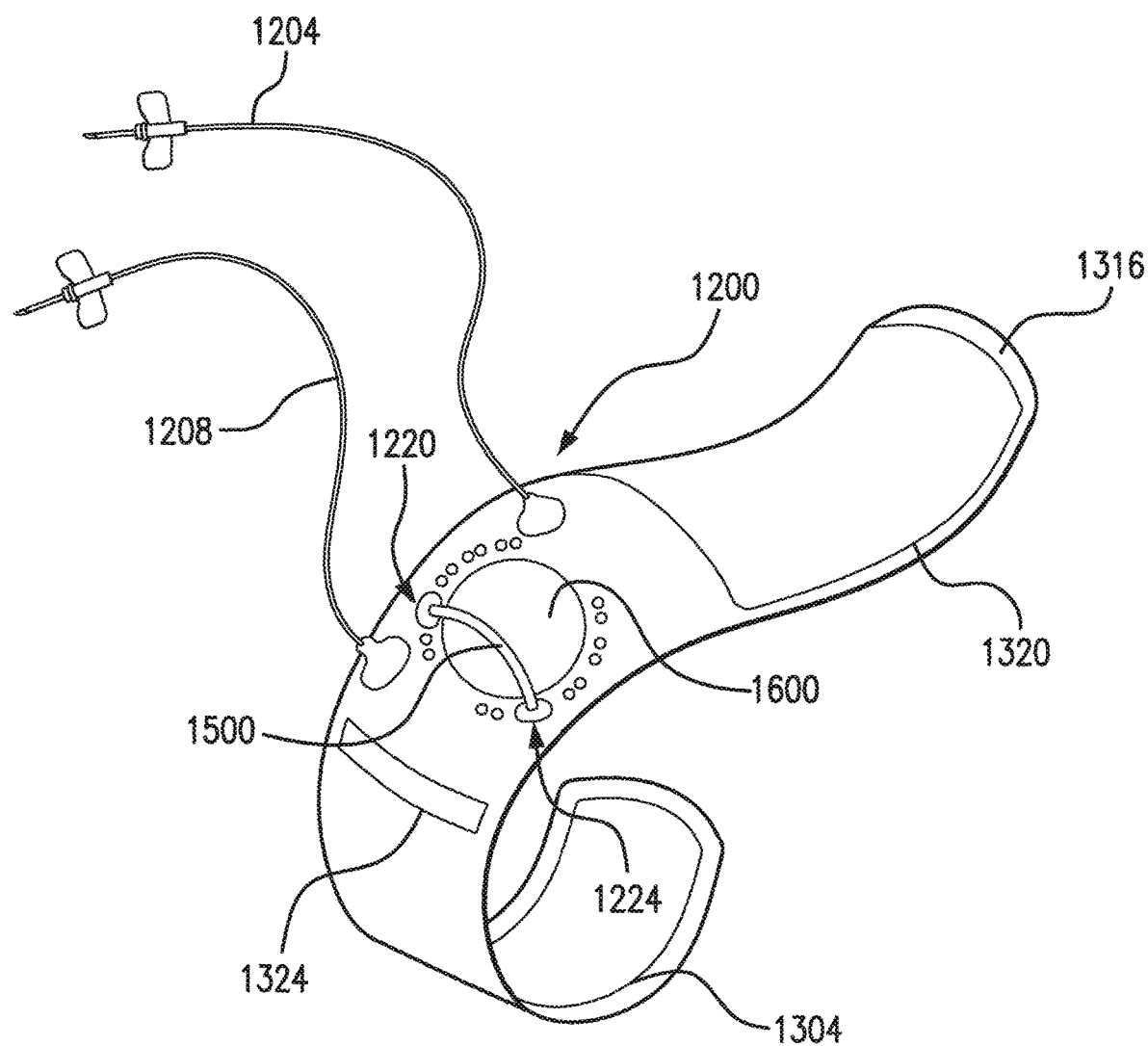
FIG. 4 is a perspective view of yet another modular system according to an embodiment of the present invention, and that includes two simulated cannulas extending from a control unit of the system, and a simulated access.

FIG. 4 is a perspective view of a modular system 1200 according to another embodiment of the present invention. Modular system 1200 includes two simulated cannulas 1204, 1208 extending from a control unit (not shown) of the system. A simulated access 1500 extends across a cannulation pad 1600. Simulated access 1500 is connected at a first end (1512 in FIG. 7) by a first pair 1220 of electrically-conductive magnetic connectors, on one side of cannulation pad 1600. Simulated access 1500 is connected at a second end by a second pair 1224 of electrically-conductive magnetic connectors, on an opposite side of cannulation pad 1600. More details about simulated access 1500 are provided in connection with the description of FIG. 7, herein.

Figure 5:
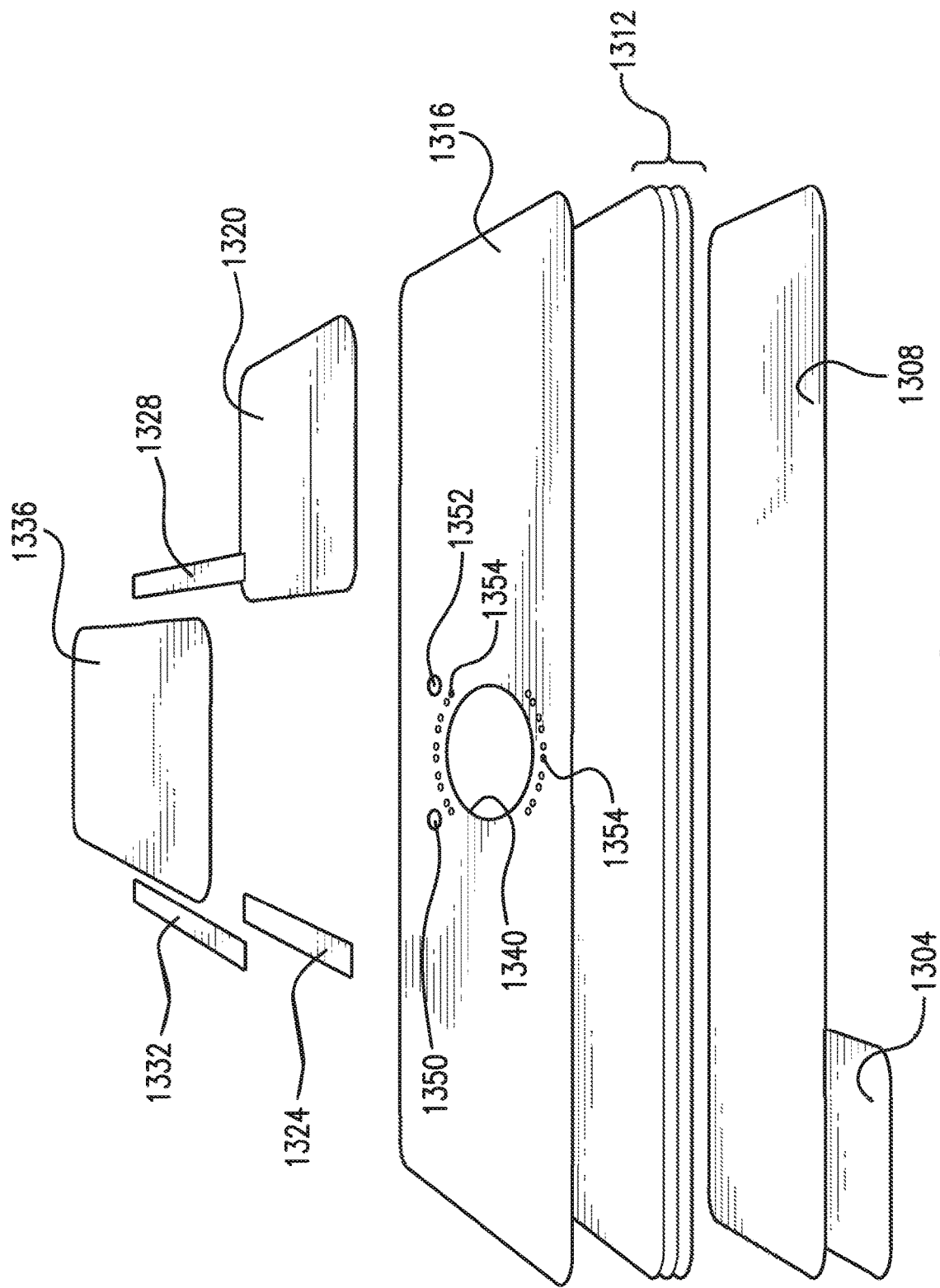
FIG. 5 is an exploded, top, front perspective view of the fabric layers, hook fastener layers, loop fastener layers, elastomeric layers, armor layer, and other layers that together, with an electrical system, make-up the modular system shown in FIG. 4.

FIG. 5 is an exploded, top, front perspective view of the fabric layers, hook fastener layers, loop fastener layers, elastomeric layers, puncture-resistant layers, and other layers that, together with a separate electrical system, make-up the modular system shown in FIG. 4. The layers include a bottom, downward-facing loop fastener patch 1304, a bottom nylon layer 1308, and a three-layer stack 1312 comprising three layers of puncture-resistant fabric such as ANSI/ISEA 105 standard-compliant, needle-resistant material, for example, SUPERFABRIC® material available from Higher Dimensions Materials, Inc. (HDM) of Oakdale, Minnesota, and available from HexArmor of Grand Rapids, Michigan.

FIG. 5 also shows a punch-out layer 1316 comprising a thin layer of material, for example, having a thickness of from 1.0 to 4.0 mm, provided with a punch-out or cut-out 1340 arranged and sized for providing access to a cannulation pad as described herein. Alternatively, cut-out 1340 can be omitted in which case infiltration would require piercing the material of punch-out layer 1316, which can be, for example, a 1.5 mm-thick layer of NEOPRENE® material. The various layers shown in FIG. 5 can be secured together by sewing, stitching, gluing, welding, adhesives, rivets, staples, laces, combinations thereof, and the like.

Punch-out layer 1316 can have a length of from 300 mm (11.8 inches) to 600 mm (23.6 inches), from 400 mm (15.7 inches) to 500 mm (19.7 inches), or, for example, of 450 mm (17.7 inches). Punch-out layer 1316 can have a width of from 100 mm (3.9 inches) to 200 mm (7.9 inches), from 120 mm (4.7 inches) to 160 mm (6.3 inches), or, for example, of 140 mm (5.5 inches). Each of bottom nylon layer 1308 and three-layer stack 1312 can independently have the same or similar dimensions as those of punch-out layer 1316.

Cannulation pad cover 1336 can have can have a length of from 100 mm (3.9 inches) to 200 mm (7.9 inches), from 125 mm (4.9 inches) to 175 mm (6.9 inches), or, for example, of 150 mm (5.9 inches). Cannulation pad cover 1336 can have a width of from 100 mm (3.9 inches) to 200 mm (7.9 inches), from 120 mm (4.7 inches) to 160 mm (6.3 inches), or, for example, of 140 mm (5.5 inches). Each of hook fastener patch 1320 and loop fastener patch 1304 can independently have the same or similar dimensions as those of cannulation pad cover 1336.

Each of loop fastener strips 1328 and 1332, and hook fastener patch 1324, can independently have a width of from 15 mm (0.6 inch) to 50 mm (2.0 inches), of from 20 mm (0.8 inch) to 30 mm (1.2 inches), or, for example, of 25.4 mm (one inch). Each of loop fastener strips 1328 and 1332, and hook fastener patch 1324, can independently have a length of from 100 mm (3.9 inches) to 200 mm (7.9 inches), from 120 mm (4.7 inches) to 160 mm (6.3 inches), or, for example, of 140 mm (5.5 inches).

Punch-outs or cut-outs 1350 and 1352 are also provided through punch-out layer 1316 to provide access for the connector ends of two simulated cannulas as described herein. The connector ends of simulated cannulas can pass through cut-outs 1350 and 1352 to enable connections with electrical circuitry underneath punch-out layer 1316. Through-holes 1354 for wires are also provided through punch-out layer 1316 to enable electrical connections between magnetic electrical connectors on the top of punch-out layer 1316 and electrical circuitry underneath punch-out layer 1316.

Two hook fastener patches 1320 and 1324 are secured to punch-out layer 1316 and each has exposed hook fasteners once the patches are secured to punch-out layer 1316. Hook fastener patches 1320 and 1324 are configured to fasten to two respective loop fastener strips 1328 and 1332 that are secured to the underside of a cannulation pad cover 1336.

Loop fastener strips 1328 and 1332, once secured to the underside of a cannulation pad cover 1336, have exposed loop fasteners. The hook fasteners and the loop fasteners can be used together to secure the assembled training system onto an arm, for example, onto a dummy's arm, onto a trainee's arm, or onto a volunteer's arm.

Figure 6:
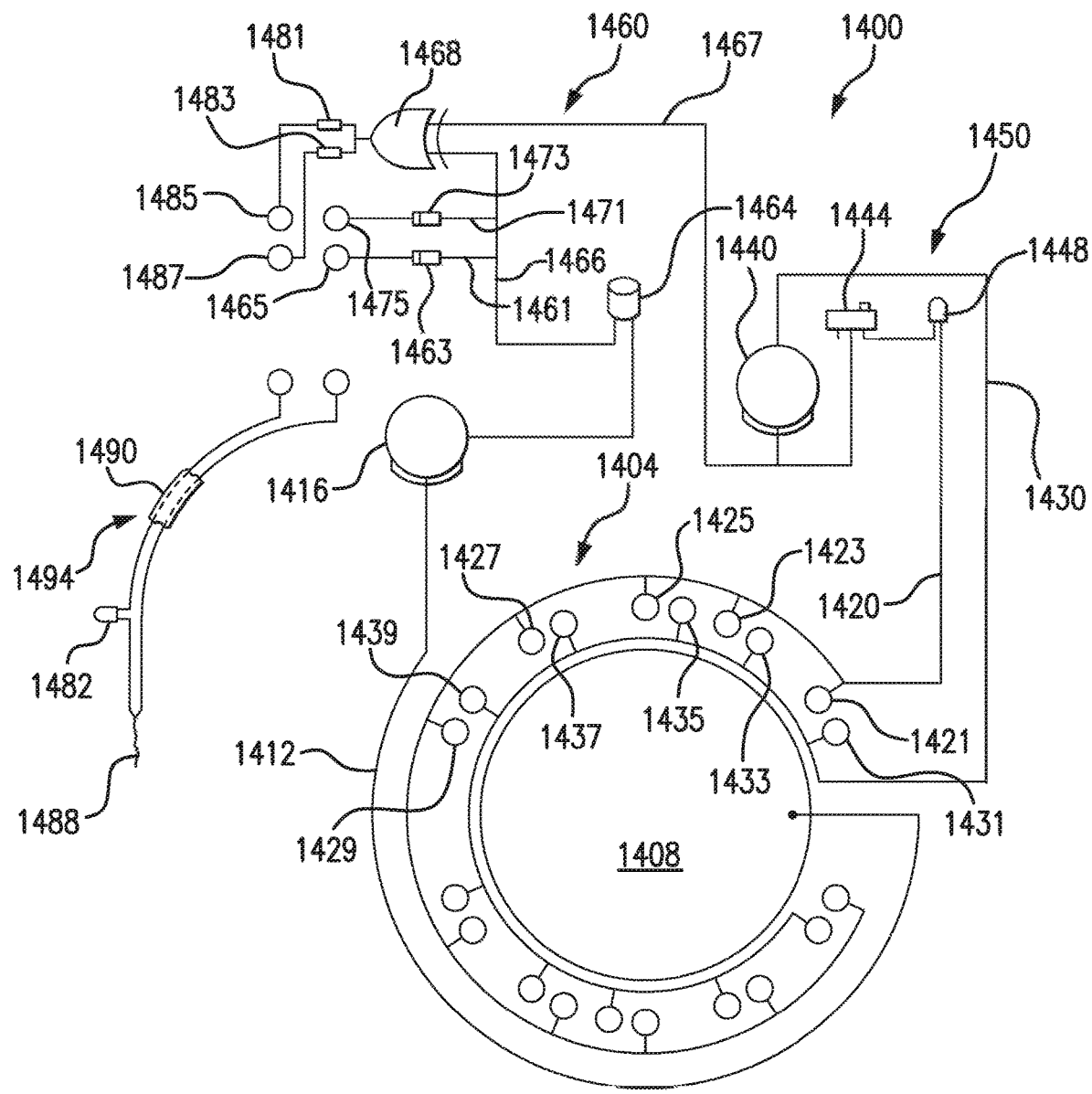
FIG. 6 is a schematic view of an electrical system including modular electrical components and circuitry, according to various embodiments of the present invention, and that can be used in the modular system shown in FIG. 4.
Figure 7:
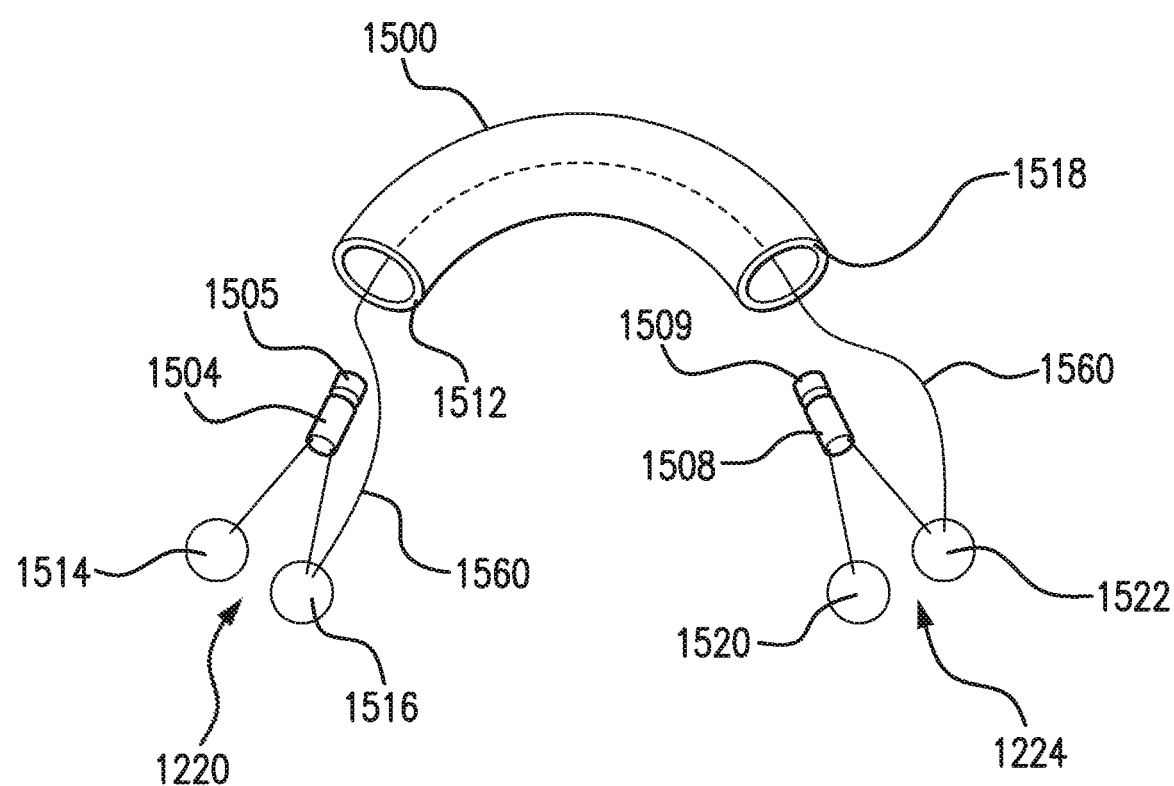
FIG. 7 is an exploded, front, perspective view of the simulated access shown in FIG. 4 and showing two pairs of serially-connected mini motors and two pairs of magnetic electrical connectors wherein one pair of magnetic electrical connectors is provided at each respective end of the simulated access.

FIG. 6 is a schematic view of an electrical system 1400 including modular electrical components and circuitry, according to various embodiments of the present invention, and that can be used in the modular system shown in FIG. 4. Electrical system 1400 comprises cannulation pad contacts 1404. Cannulation pad contacts 1404 include an electrically-conductive mesh patch 1408 connected, via wiring 1412, to a battery 1416. Battery 1416 can be, for example, a USB port-rechargeable lithium battery or a coin-sized battery such as a CR 2023 battery. Cannulation pad contacts 1404 also comprise electrically-conductive magnetic contacts 1421, 1423, 1425, 1427, 1429, and others, serially connected to a first pad lead 1420. Cannulation pad contacts 1404 also comprise electrically-conductive magnetic contacts 1431, 1433, 1435, 1437, 1439, and others, serially connected to a second pad lead 1430. A motor-powering circuit 1450 is provided that includes cannulation pad contacts 1404, first pad lead 1420, second pad lead 1430, a second battery 1440, a switch 1444, and an indicator light 1448 such as a blue LED to indicate when electricity is switched on through motor-powering circuit 1450. When switched on, and a simulated access is properly connected to the cannulation pad, motor-powering circuit 1450 sends current through both serially-connected motors of a simulated access, powering the motors to vibrate and provide a haptic response at the simulated access. An exemplary simulated access 1500, that can be used with or be a part of circuit 1450, is shown in FIG. 7.

As shown in FIG. 6, electrical system 1400 also comprises a cannulation verification circuit 1460 for providing confirmation of a successful cannulation, alarm notification in the event of an infiltration, or both. Cannulation verification circuit 1460 can be configured to activate a success indicator in the event of a successful cannulation. Activating the success indicator can comprise the activation of a red LED, of a pulsing LED, of a combination thereof, or the like. A pulsing red LED to mimic a blood pulse in a patient, is provided with appropriate circuitry.

Cannulation verification circuit 1460 can comprise a buzzer 1464, for example a 5-volt buzzer. In combination, a 6-volt battery can be provided as battery 1416. A lead 1466 connects buzzer 1464 to an Ex-OR gate 1468 and/or to other circuitry to configure a desired result. Stemming from lead 1466 are two branches 1461, 1471, respectively, with each also connected to a respective diode 1463, 1473 that in-turn connects to a respective connector 1465, 1475. The circuitry can be configured such that, if the buzzer goes off due to an infiltration, then the LED indicator light provided along the simulated cannula can be made to turn off.

Also connected to Ex-OR gate 1468 is a lead 1467 stemming from motor-powering circuit 1450 and completing a circuit through a simulated cannula upon proper cannulation into a simulated access. An indicator, for example, an indicator light such as an LED 1482, or more specifically, a red LED, can be configured to light-up upon a proper cannulation of a simulated access, in the event that a simulated cannula 1494, including such an LED 1482, is connected at connectors 1484 and 1486 to respective connectors 1487 and 1465 of cannulation verification circuit 1460. Although not shown, circuitry can also be provided to pulse LED 1482, for example, to further mimic a blood pulse through the simulated cannula. Similarly, a second simulated cannula can be connected to connectors 1475, 1485 to similarly test whether the second simulated cannula is properly cannulated into the simulated access or whether an infiltration has taken place. A resistor 1481 is provided between connector 1485 and Ex-OR gate 1468 and is matched with LED 1482 to prevent burn-out of LED 1482 of simulated cannula 1494. Similarly, a resistor 1483 is provided between connector 1487 and Ex-OR gate 1468 and is also matched with LED 1482, or with an LED in a simulated cannula configured to connect to connector 1487, to prevent burn-out of the LED.

FIG. 7 is an exploded, front, perspective view of simulated access 1500 shown in FIG. 4. At the ends of simulated access 1500, two pairs of magnetic electrical connectors are provided. More specifically, at a first end 1512 of simulated access 1500, a first pair of magnetic electrical connectors 1514, 1516 is provided. At a second end 1518 of simulated access 1500 a second pair of magnetic electrical connectors 1520, 1522 is provided.

As shown in FIG. 7, a simulated access 1500 is provided with two motors 1504, 1508, for example, mini, coreless motors. Each motor can comprise a coreless motor, a mini-motor, an asymmetric-weight motor, an impeller, a cell-phone vibrator motor, a combination thereof, or the like. Motors 1504 and 1508 can be connected to each other, in series, through a wired connection, through the conductive slime in the simulated access, or through a combination thereof. In the embodiment shown in FIG. 7, motors 1504 and 1508 are connected to each other in series by both a through wire 1560 and conductive slime filled in the simulated access. Motors 1504 and 1508 are configured to spin respective asymmetric weights 1505, 1509 such that vibratory motion is caused at each end of the simulated access. The vibratory motion provides a haptic response to the cannulation training and more effectively mimics a real cannulation experience. Coupled with an indicator such as a pulsing red LED to indicate a successful simulated cannulation, a more realistic, haptic, training experience can be realized.

Although magnetic electrical connectors 1516 and 1522 are shown in FIG. 7 as being in electrical contact with each other via through wire 1560, through wire 1560 can be omitted such that magnetic electrical connectors 1516 and 1522 electrically connect to one another through only the conductive slime inside simulated access 1500. The inclusion of through wire 1560, however, provides a pathway for double-dipping and ensures a pathway of very low resistance between magnetic electrical connectors 1516 and 1522, independent of the conductive slime provided in simulated access 1500.

Figure 8:
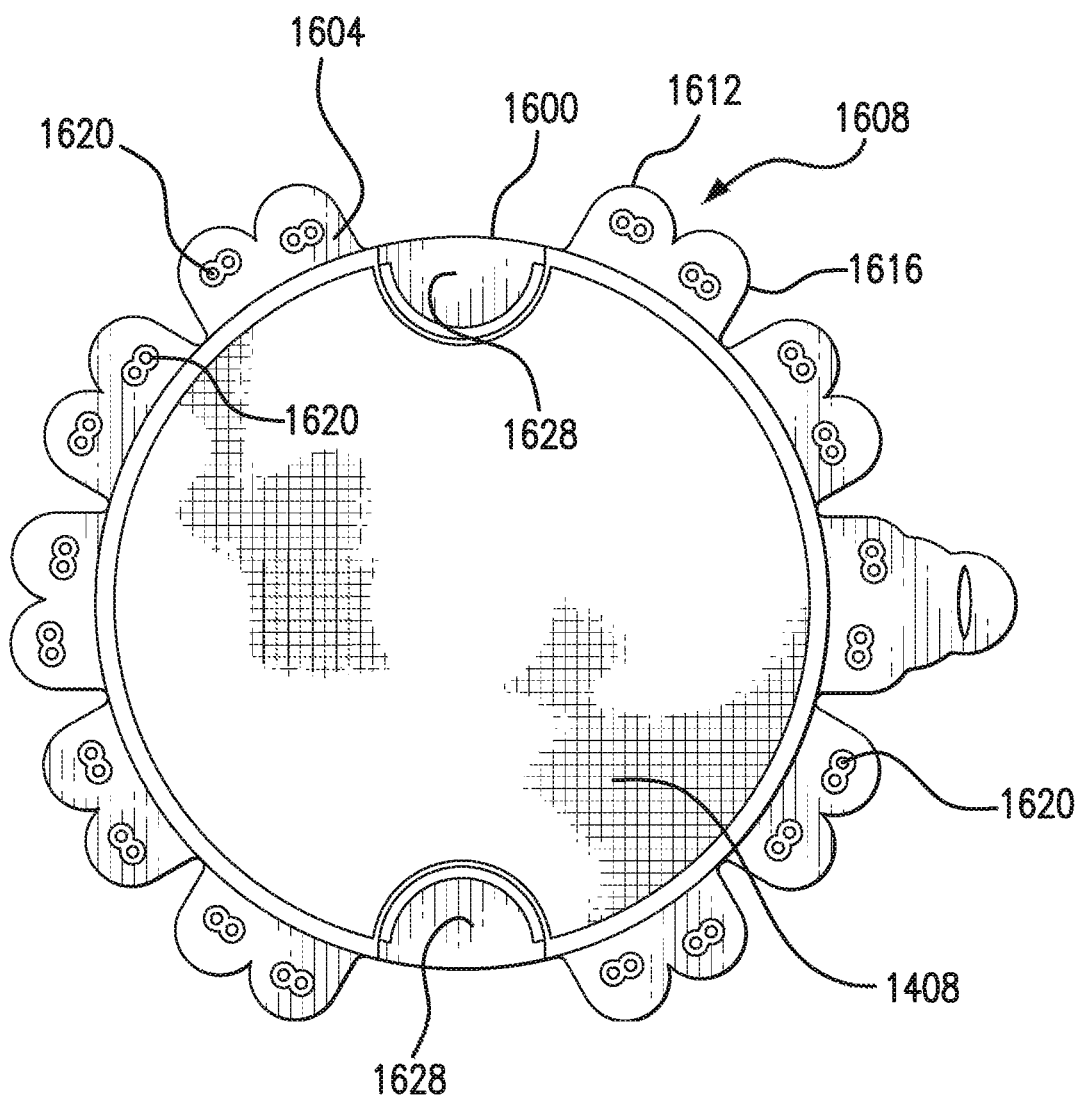
FIG. 8 is a bottom view of a cannulation pad according to another embodiment of the present invention.

FIG. 8 is a bottom view of cannulation pad 1600 that is also shown in FIG. 4. Cannulation pad 1600 comprises a 3-D printed layer 1604 of electrically insulative material that defines a plurality of pairs of tabs, for example, pair 1608 consists of tab 1612 and tab 1616. Tabs 1612 and 1616, along with the other tabs, are used for mounting on the top of cannulation pad 1600 respective magnetic connector holders each of which is configured to hold a pair of magnets as described herein with respect to FIG. 9. Tabs 1612, 1616, and the others, comprise tab through-holes 1620 for threading therethrough an electrically conductive wire that can be used for securing the magnet holders on the top of cannulation pad 1600. Wires threaded through tab through-holes 1620 can also be electrically connected to electrically-conductive magnetic connectors held in the magnet holders, for example, by soldering or by using a conductive epoxy adhesive.

Cannulation pad 1600 also comprises electrically-conductive mesh patch 1408 that is described in more detail above in connection with the circuitry shown in FIG. 6. Two inwardly extending tabs 1628 are also formed as part of 3-D printed layer 1604 and can be sewn to electrically-conductive mesh patch 1408 to maintain the mesh patch in place. 3-D printed layer 1604 can be ring-shaped, that is, open in the middle so as not to obstruct access to electrically-conductive mesh patch 1408, from above. Alternatively, 3-D printed layer 1604 can be circular in shape, not open in the middle, in which case infiltration would require piercing the material of 3-D printed layer 1604 before making contact with electrically-conductive mesh patch 1408. An electrical lead or connector tab (not shown) can be provided, electrically attached to electrically-conductive mesh patch 1408, to facilitate the connection and disconnection of a circuit wire to and from electrically-conductive mesh patch 1408.

Figure 9:
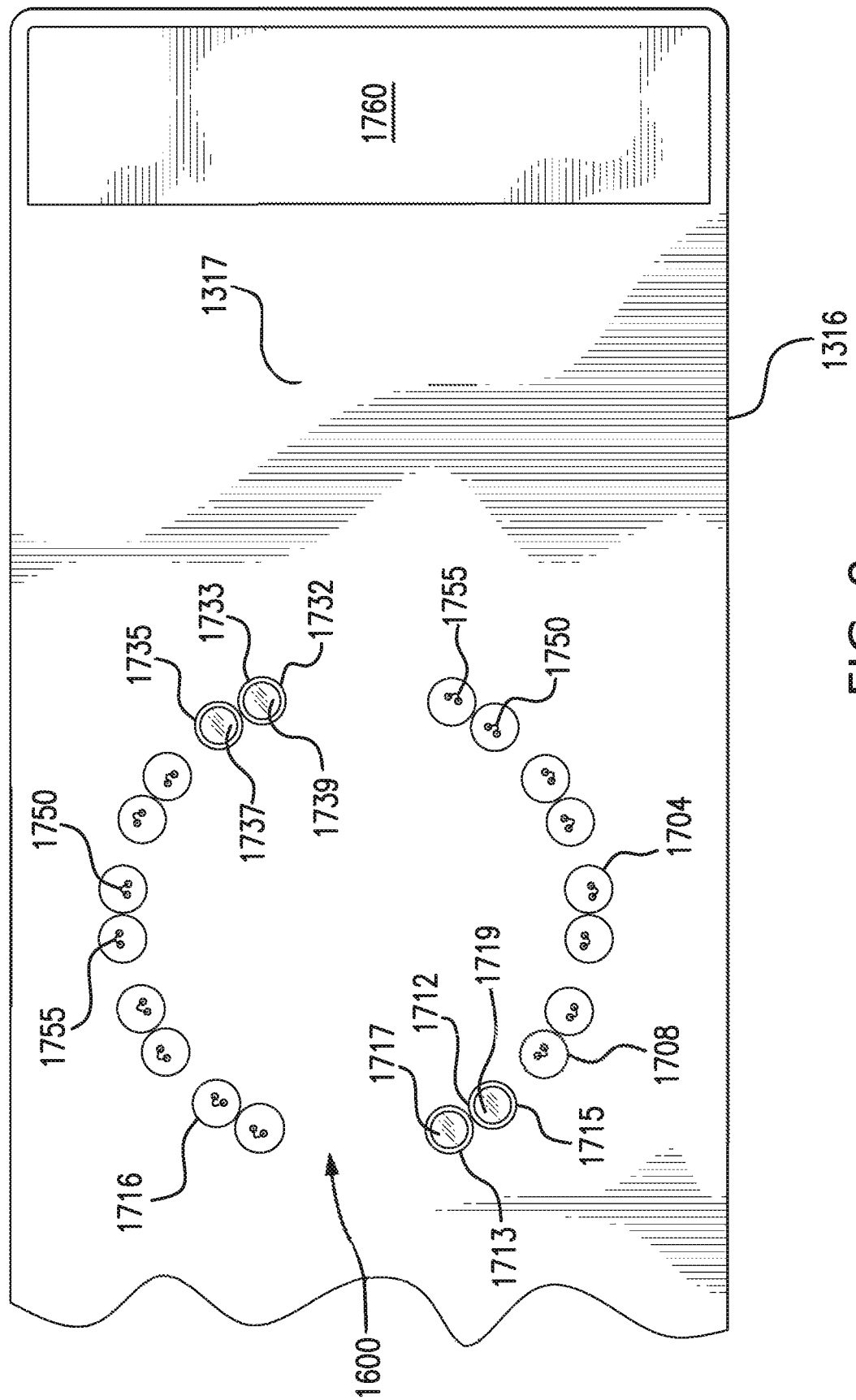
FIG. 9 is a top, perspective view of the cannulation pad shown in FIG. 8 and showing respective connector pair holders each configured for holding a pair of magnetic connectors.

FIG. 9 is a top, perspective view of cannulation pad 1600 shown in FIG. 8 and showing respective connector pair holders 1704, 1708, 1712, 1716, and others, each configured for holding a pair of magnetic connectors. For example, pair holder 1712 comprises a first cup 1713 and a second cup 1715 configured to snugly hold magnetic connectors 1717 and 1719, respectively. As can be seen, the connector pair holders are mounted on the top surface 1317 of punch-out layer 1316. More details about punch-out layer 1316 are described in connection with FIG. 5 herein. For the sake of simplicity, only two pairs of magnetic connectors are shown in FIG. 9, in only two of the pair holders, namely, magnetic connectors 1717 and 1719 in cups 1713 and 1715, respectively, make-up one pair of magnetic connectors, and magnetic connectors 1737 and 1739 in cups 1733 and 1735, respectively, make-up a second pair of magnetic connectors. A simulated access such as simulated access 1500 shown in FIG. 7 can be connected at its two ends to the respective pairs of magnetic connectors such that the simulated access can extend across cannulation pad 1600 and be well-positioned to detect a proper cannulation of the simulated access. Also, with such positioning of the simulated access, cannulation pad 1600 is well-positioned to detect an infiltration of a simulated canula needle in the event that the simulated access is not properly canulated.

As shown in FIG. 9, besides pair holders 1712 and 1732, the other pair holders, for example, pair holders 1704, 1708, 1716, do not yet have magnetic connectors fixed therein but instead show a conductive trace or wire 1750 or 1755 in the bottom of the cups ready to make contact with and be soldered or glued to respective magnetic connectors. Wires 1750 and 1755 can be connected to an electronics circuit primarily housed in an electronics unit 1760. In an example, the circuit shown in FIG. 6 can be used with cannulation pad 1600 of FIGS. 8 and 9, and wire 1755, threaded through the bottom of every other cup, can be connected to a first lead such as lead 1420 shown in FIG. 6. Wire 1750 can pass through the bottoms of the remaining cups, on the other hand, and be connected to a second lead such as lead 1430 shown in FIG. 6.

For each pair of magnetic connectors of cannulation pad 1600, one of the magnets can be oriented with it north magnetic pole facing outwardly whereas the other magnet of the pair can be oriented with its south magnetic pole facing outwardly. A simulated access, such as simulated access 1500 shown in FIG. 7, can thus be provided with its first pair of magnetic electrical connectors 1514, 1516 mounted in a side-by-side arrangement, for example, in an end cap having side-by-side cup holders such that one of the magnets (e.g., 1514) can be oriented with it north magnetic pole facing outwardly whereas the other magnet of the pair (e.g., 1516) can be oriented with its south magnetic pole facing outwardly. For the opposite end of simulated access 1500, the two outwardly facing magnet polarities can be switched. As such, magnet connector 1516 of simulated access 1500 contacts one of the leads 1420 or 1430 of motor-powering circuit 1450 shown in FIG. 6, magnet connector 1522 of simulated access 1500 contacts the other of the leads 1420 or 1430 of motor-powering circuit 1450 shown in FIG. 6, and through wire 1560 of simulated access 1500 bridges leads 1420 and 1430. By bridging leads 1420 and 1430, motor-powering circuit 1450 can be closed, enabling motors 1504 and 1508 of simulated access 1500 to be powered when switch 1444 is turned on.

With such an arrangement of magnet pairs along the periphery of cannulation pad 1600, and such an arrangement of magnets at the ends of simulated access 1500, simulated access 1500 can only be connected in a proper fashion to cannulation pad 1600. A proper connection is useful in setting up proper electrical circuitry and powering the motors in the simulated access. Once fully assembled, ten pairs of electrically-conductive magnets are provided. The first magnet of each respective pair can be serially connected to the other first magnets of the pairs. The second magnet of each respective pair can be serially connected to the other second magnets of the pairs. As such, the pairs of magnets can be arranged as shown in FIG. 6.

Figure 10:
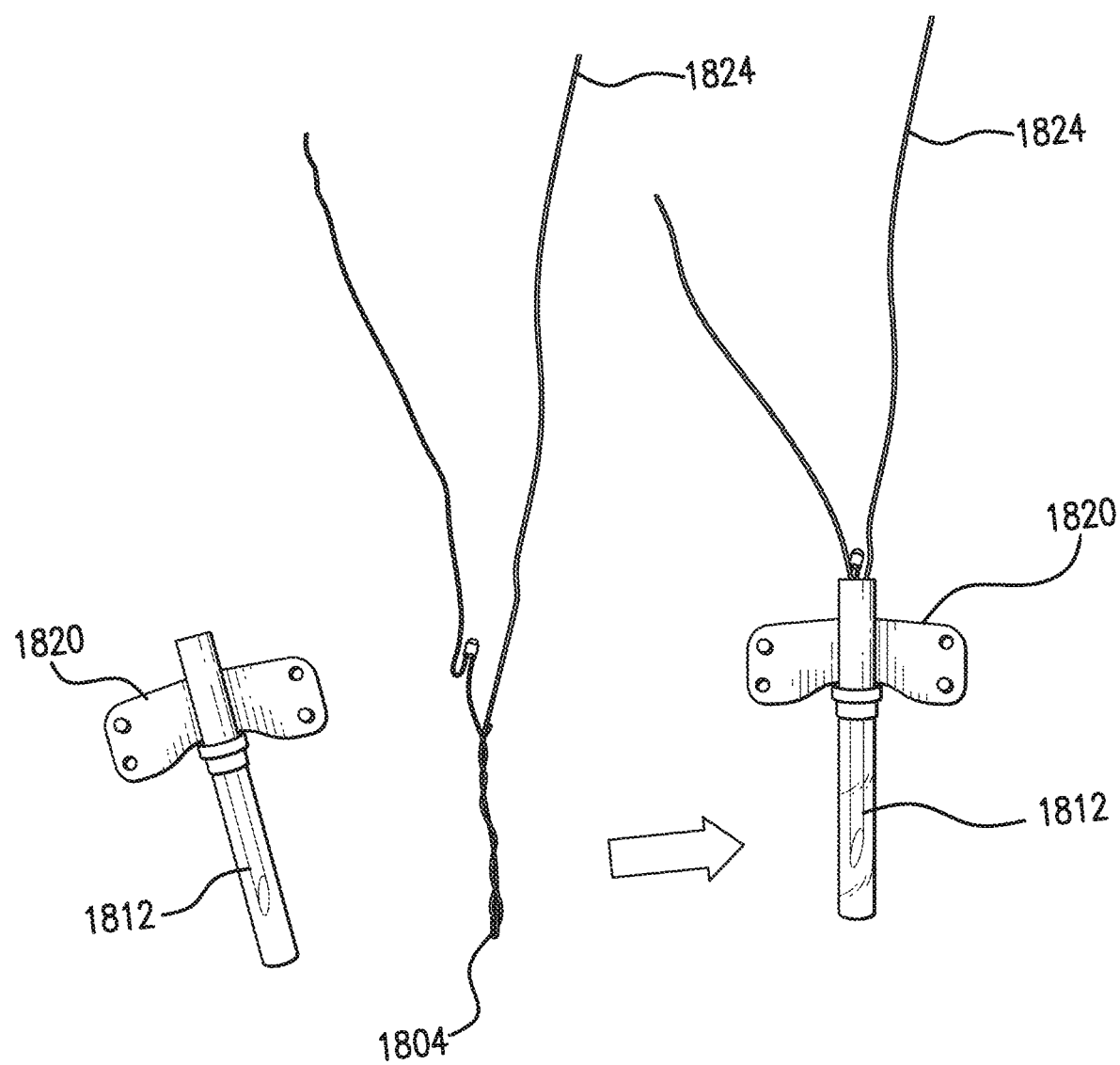
FIG. 10 is a top view of the needle end of a simulated cannula that can be used with the modular system shown in FIGS. 4-9, before and after insertion into an electrically-conductive cannula needle tip.

FIG. 10 is a top view of the wound needle end 1804 of a simulated cannula dual wire 1808 that can be used in a simulated canula and with the modular system shown in FIGS. 4-9. FIG. 10 shows wound needle end 1804 before and after insertion into a separately provided electrically-conductive hollow cannula needle tip 1812, which is shown in FIG. 10 protected by a cap 1816. A user, trainee, or prescriber can order and/or use a cannula needle tip 1812 of his or her own choosing and the simulated cannula does not need to be shipped or delivered with a cannula needle tip. The configuration enables a user to use any off-the-shelf needle or needle set, with the simulated cannula dual wire device and the simulated cannula training system. The user, trainee, or prescriber can insert wound needle end 1804 of dual wire 1808 into the hollow cannula needle tip 1812 and friction alone can be used to maintain wound needle end 1804 inside and in electrical contact with hollow cannula needle tip 1812.

As can be seen in FIG. 10, electrically-conductive hollow cannula needle tip 1812 can be capped and protected by cap 1816 right up until the start of cannulation training with the modular system. Electrically-conductive hollow cannula needle tip 1812 can be connected to a set of wings 1820 that facilitate handling the hollow cannula needle tip, uncapping and capping the hollow cannula needle tip, and securing the hollow cannula needle tip. Securing can involve, for example, taping the needle tip to the arm of a user, patient, or trainee, taping the needle tip to an arm band, or taping the needle tip to an arm cradle. In FIG. 10, a protective, insulative sheath has been peeled away from the simulated cannula shown to expose first and second conductive wires 1824 and 1828 that run the length of the simulated cannula, for example, as shown in FIG. 6. In FIG. 6, similarly, almost all of the protective, insulative sheath 1490 has been peeled away to show first and second conductive wires akin to first and second conductive wires 1824 and 1828. Either or both of first and second conductive wires 1824 and 1828 can be insulated along its length or their lengths, except for at the ends of first and second conductive wires 1824 and 1828 where the two wires are wound together, to each other, to form wound needle end 1804. One of first and second conductive wires 1824 and 1828 is configured to be electrically connected to resistor 1481 or 1483, while the other of first and second conductive wires 1824 and 1828 is configured to connect to the circuit including buzzer 1464 through lead 1466.

FIGS. 11A-15B show various views of a simulated cannula according to yet a further embodiment of the present invention. FIG. 11A is a side view of a simulated cannula 1100, according to various embodiments of the present invention. FIG. 11B is a top view of simulated cannula 1100, shown in FIG. 11A. FIG. 11C is a side view of simulated cannula 1100, shown in FIGS. 11A and 11B, and showing, in partial cutaway, a needle coupler assembly 1116. FIG. 11D is an enlarged view of section 11D shown in FIG. 11C.

As show in FIGS. 11A-11D, simulated cannula 1100 includes a replaceable needle assembly 1102. Replaceable needle assembly 1102 has a needle 1104, a set of wings 1108, and a hollow flexible tube 1112. Simulated cannula 1100 further includes a needle coupler assembly 1116. Needle coupler assembly 1116 that includes a coupler housing 1120, a compression nut 1124, and a connector 1128. Extending from coupler housing 1120 and into hollow flexible tube 1112 are a fiber optic or optical fiber 1156 and a conductor 1160. A connecting cable 1180 electrically connects needle coupler assembly 1116 with a power source and with signal sending and receiving circuitry of a control unit. Connecting cable 1180 has a first male connector 1184*a* and a second male connector 1184*b*. First male connector 1184*a* is releasably connected to needle coupler assembly 1116, while second male connector 1184*b* releasably connects to the control unit.

FIG. 11D illustrates internal components that are housed within coupler housing 1120. As can be seen, optical fiber 1156 and conductor 1160 terminate within coupler housing 1120. A proximal end of conductor 1160, within coupler housing 1120, is connected to a spring finger 1172, which will be described in more detail below.

Figure 12B:
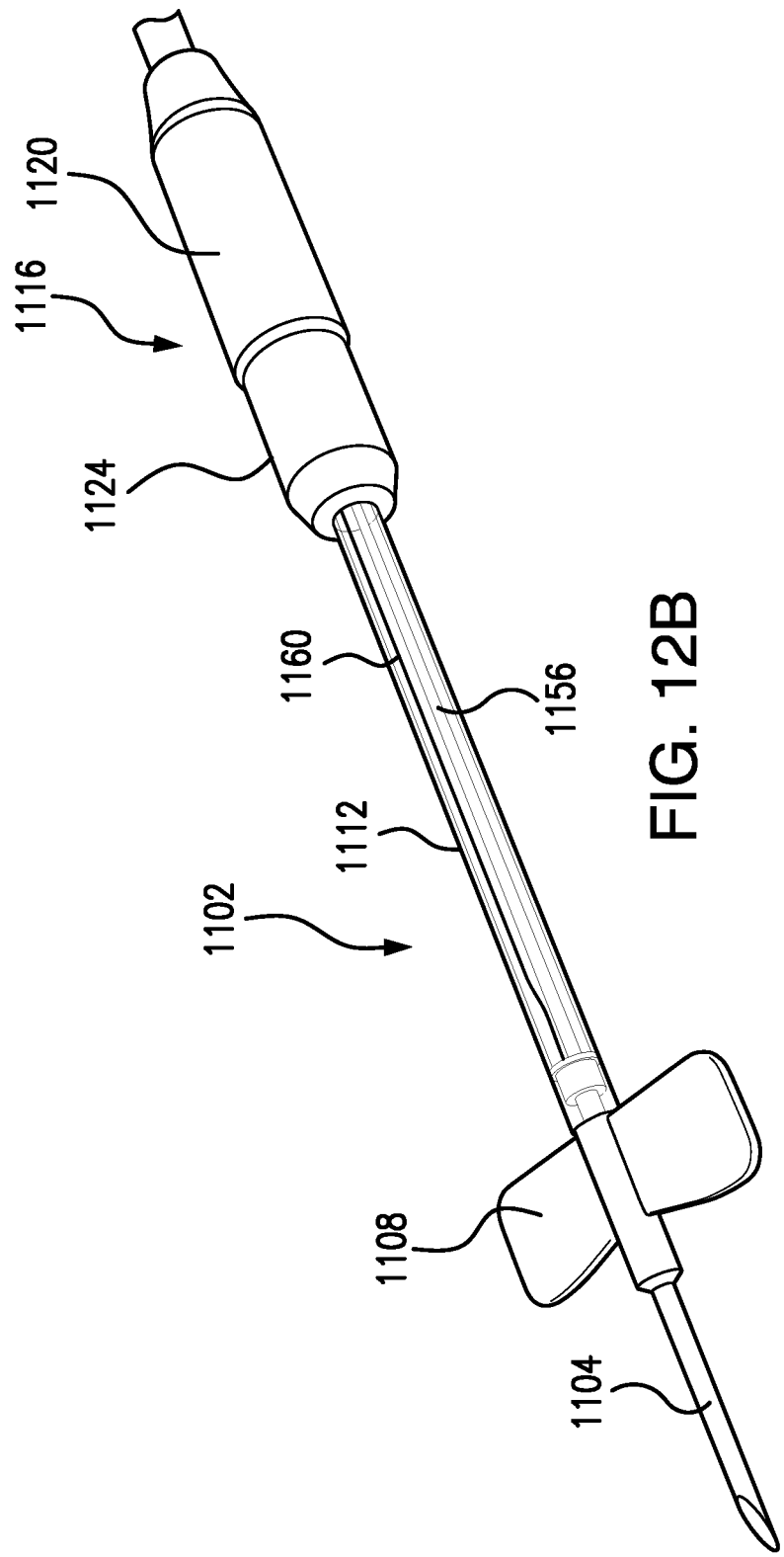
FIG. 12B is a top perspective view of the replaceable needle assembly and the needle coupler assembly show in FIG. 12A, assembled together.

FIG. 12A is a top perspective view of replaceable needle assembly 1102 and needle coupler assembly 1116, according to various embodiments of the present invention, and prior to being assembled together. FIG. 12B is a top perspective view of replaceable needle assembly 1102 and needle coupler assembly 1116 show in FIG. 12A, assembled together. Needle 1104, set of wings 1108, and hollow flexible tube 1112, of replaceable needle assembly 1102, can also be seen in FIG. 12B. Prior to assembly, compression nut 1124 of needle coupler assembly 1116 is detached from coupler housing 1120. Compression nut 1124 is then fit over the end of hollow flexible tube 1112 opposite the end connected to needle 1104 and set of wings 1108. Extending from coupler housing 1120 are optical fiber 1156 and conductor 1160. Coupler housing 1120 includes a male threaded hollow shaft 1136 (FIG. 12A) that mates with female threads of compression nut 1124. During assembly, conductor 1160 and optical fiber 1156 are inserted through compression nut 1124 and into hollow flexible tube 1112. An opening of coupler housing 1120 at the end of male threaded shaft 1136 meets with the end of hollow flexible tube 1112 within compression nut 1124. Compression nut 1124 is then screwed onto male threaded shaft 1136, or vice versa, which in clamps compression nut 1124 against hollow flexible tube 1112, and connects needle coupler assembly 1116 to replaceable needle assembly 1102.

FIG. 13 is a top perspective view of needle coupler assembly 1116 shown in FIGS. 11A-12B, and a connecting cable 1180, according to various embodiments of the present invention, disconnected from one another. Needle coupler assembly 1116 is shown without compression nut 1124, in FIG. 13. As can be seen, conductor 1160 and optical fiber 1156 extend from coupler housing 1120. Connecting cable 1180 can include any type of connecting cable 1180 that releasably connects with needle coupler assembly 1116 to electrically connect needle coupler assembly 1116 to a control unit. For example, connecting cable 1180 can be a phone connector, audio cable, headphone cable, USB cable, RCA cable, or the like. Each end of the connecting cable 1180 can include a male connector 1184*a*, 1184*b*. Each of male connectors 1184*a*, 1184*b* can independently be a 2.5 mm jack plug, a 3.5 mm jack plug, a 4.4 mm jack plug, a 6.35 mm jack plug, an RCA plug, a USB plug, a mini-USB plug, a lightning wire plug, or any other type of plug. First male connector 1184*a* releasably attaches to connector 1128 of needle coupler assembly 1116 and second male connector 1184*b* releasably attaches to the control unit. Second male connector 1184*b* can instead be in the form of a 90-degree connector, a flat connector, or have another design.

Figure 14A:
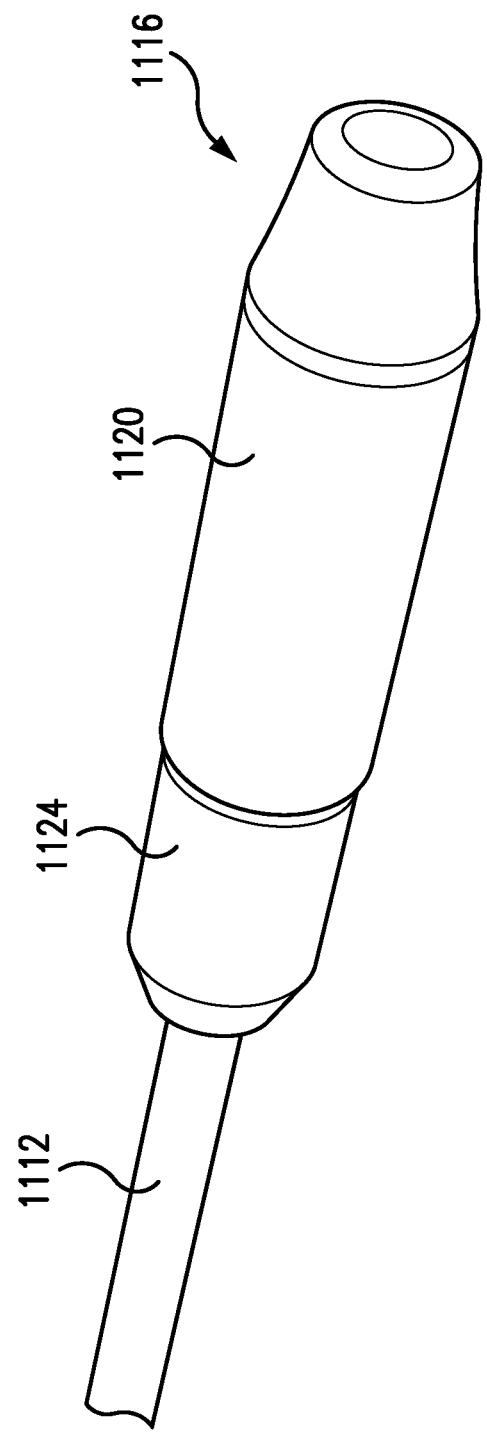
FIG. 14A is a top, right perspective view of a needle coupler assembly secured to a hollow flexible tube of a replaceable needle assembly, according to various embodiments of the present invention.
Figure 14B:
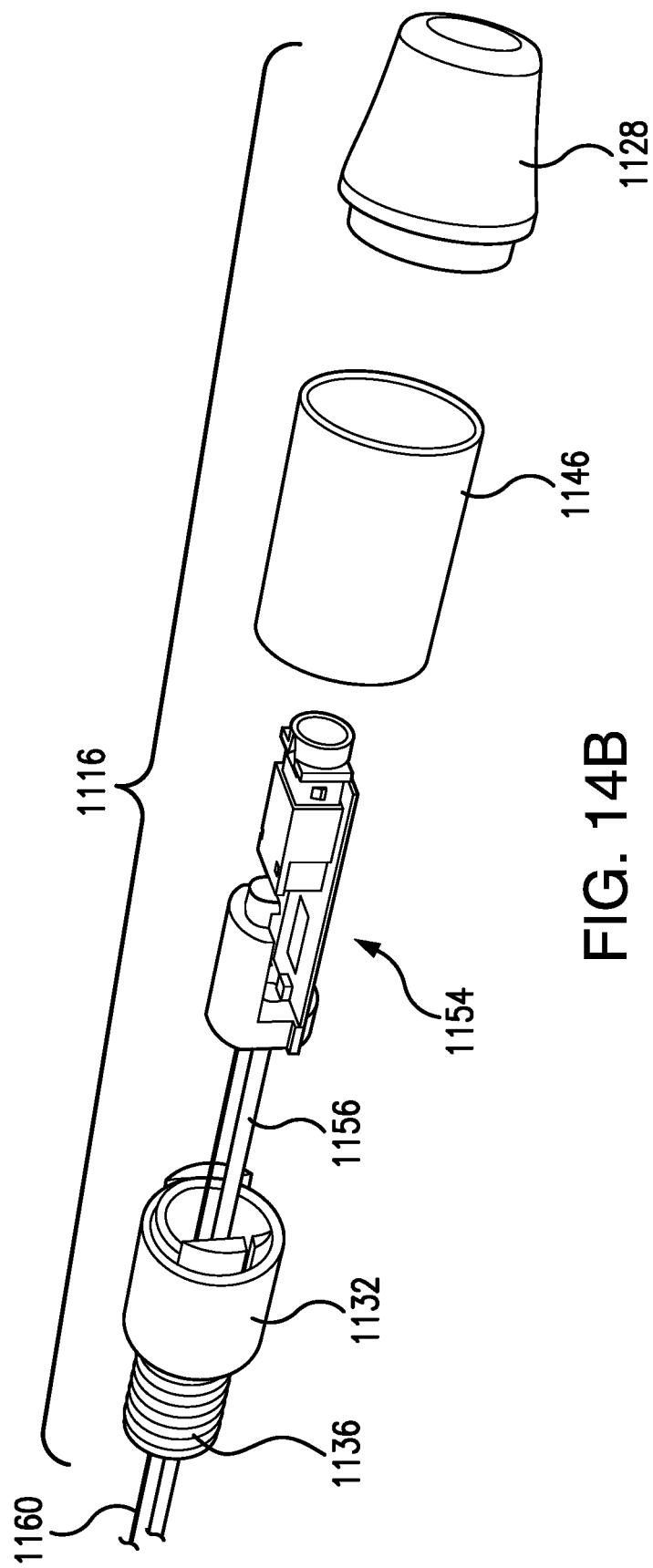
FIG. 14B is an exploded view of the needle coupler assembly shown in FIG. 14A, without the compression nut secured, and showing an optical fiber and conductor extending through the coupler front housing and bonded to the fiber optic and conductor adapter.

FIG. 14A is a top, right perspective view of needle coupler assembly 1116 connected to hollow flexible tube 1112, according to various embodiments of the present invention. FIG. 14B is an exploded view of needle coupler assembly 1116 shown in FIG. 14A, but without showing compression nut 1124 or hollow flexible tube 1112. As mentioned above, needle coupler assembly 1116 includes coupler housing 1120 (FIG. 14A). Coupler housing 1120 includes a coupler front housing 1132 and a coupler rear housing 1146 that are releasably or permanently connectable, for example, via connectors. Once assembled, coupler front housing 1132 and coupler rear housing 1146 are connected together. Coupler front housing 1132 includes male threaded shaft 1136 and an axial opening defined therethrough. Coupler rear housing 1146 also has an axial opening that aligns with the axial opening of coupler front housing 1132 when coupler front housing 1132 is connected with coupler rear housing 1146. Connector 1128 can be, for example, elastomer connector that fits within a rear opening of coupler rear housing 1146. Connector 1128 also includes an axial opening that aligns with the axial opening of coupler rear housing 1146 when connector 1128 is connected to coupler rear housing 1146. Disposed within coupler housing 1120 is a fiber optic and conductor adapter 1154.

Figure 14C:
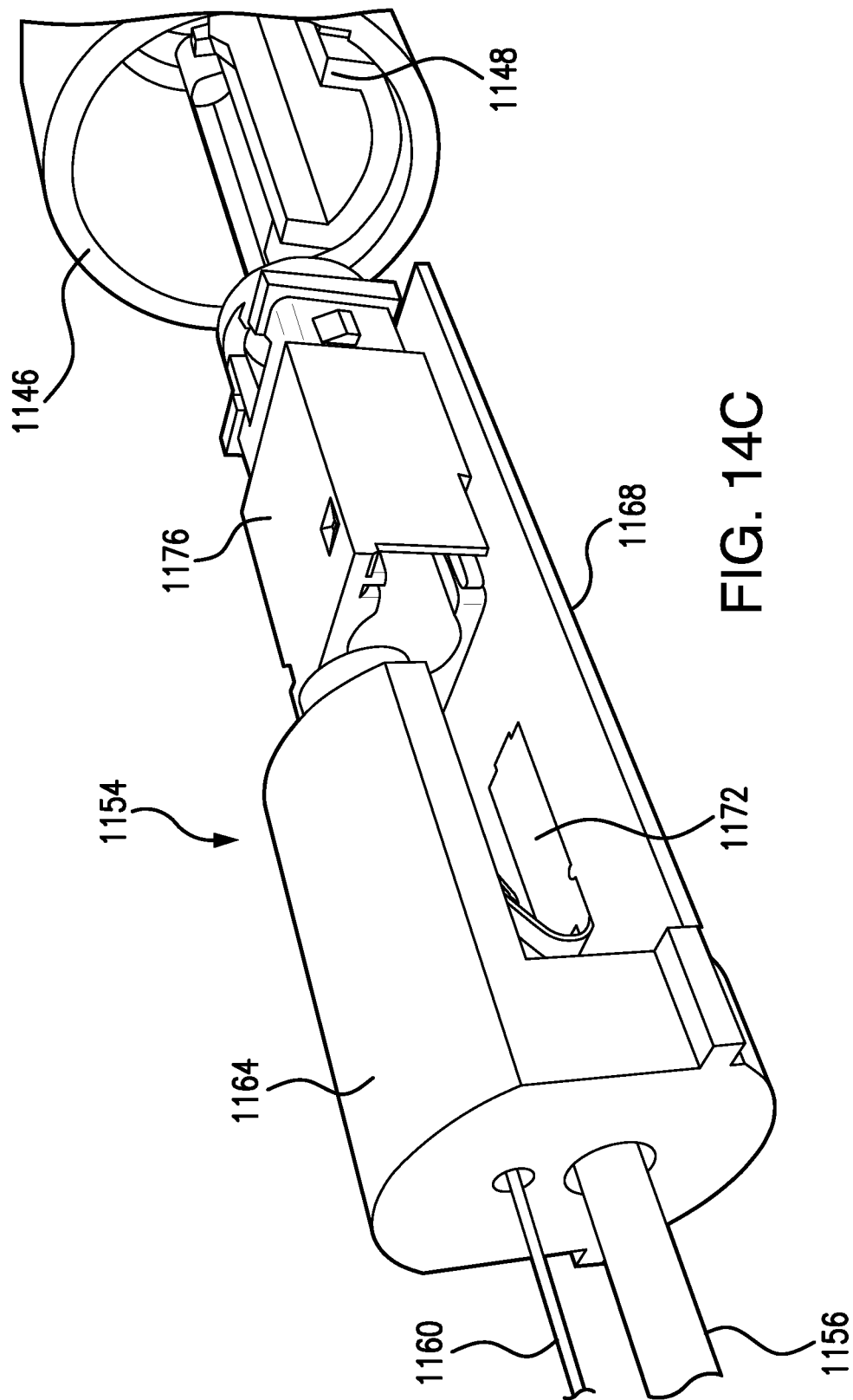
FIG. 14C is an enlarged, top, left perspective view of the fiber optic and conductor adapter shown in FIG. 14B.
Figure 14D:
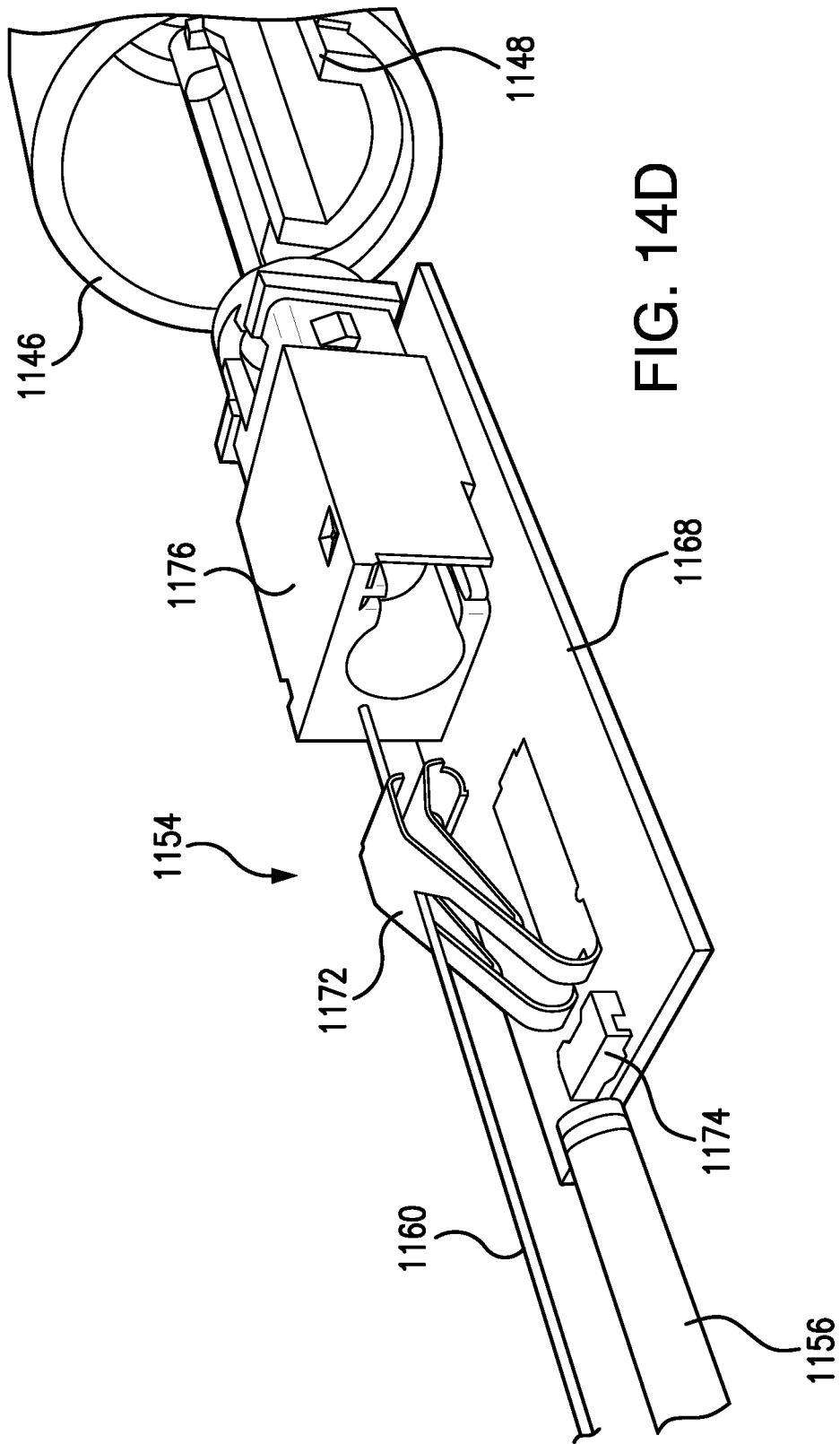
FIG. 14D is an enlarged, top, left, perspective view of the inside of the fiber optic and conductor adapter shown in FIG. 14C.

FIG. 14C is an enlarged, top, left perspective view of fiber optic and conductor adapter 1154 shown in FIG. 14B. FIG. 14D is an enlarged, top, left, perspective view of the inside of fiber optic and conductor adapter 1154 shown in FIGS. 14B and 14C, with a cover 1164 removed. As can be seen, adapter 1154 includes a printed circuit board 1168. A female jack 1176, a spring finger 1172, and a light emitting diode 1174 are connected to printed circuit board 1168 as is appropriate electrical circuitry. Light emitting diode 1174 can instead be an organic LED, comprise quantum dots, include a filament, or any other type of light emitter. Spring finger 1172 and light emitter 1174 can be electrically connected to printed circuit board 1168, for example, by circuitry (not shown) on the underside of printed circuit board 1168. Optical fiber 1156 and conductor 1160 are bonded or otherwise attached to cover 1164, and cover 1164 aligns optical fiber 1156 with LED 1174 thus guiding light emitted from LED 1174 into and through optical fiber 1156. Cover 1164 also protects the connection between conductor 1160 and spring finger 1172. Conductor 1160 passes through a spring-biased opening of spring finger 1172 and makes electrical contact with spring finger 1172.

When assembled, cover 1164 fits within the axial opening of coupler front housing 1132. Printed circuit board 1168 rests on a ledge 1148 within coupler rear housing 1146. Coupler front housing 1132 and coupler rear housing 1146 are connected together, securing fiber optic and conductor adapter 1154 there within. When needle coupler assembly 1116 is in its assembled state, and first male connector 1184a of connecting cable 1180 is inserted through connector 1128 and into female jack 1176, as shown in FIG. 11D, a tip of first male connector 1184a electrically engages with conductor 1160 so that conductor 1160 can be electrically connected to a control unit. Another lead of connecting cable 1180 can be configured to be electrical contact with and supply power to LED 1174 under certain conditions such as when a cannulation circuit is completed without infiltration.

FIG. 15A is an enlarged view of conductor 1160 extending from the distal end of hollow flexible tube 1112 of simulated cannula 1100, shown in FIGS. 11A-14D. As can be seen, the distal end of conductor 1160 extends out of hollow flexible tube 1112 such that the conductor 1160 can make electrical contact with a metal or metallic needle 1104 (FIG. 15B). Conductor 1160 is provided with a wave, wavy, or sinusoidal shape to ensure that at least a portion of conductor 1160 contacts needle 1104 to make electrical contact therewith. FIG. 15B is a top perspective view of conductor 1160 and fiber optic line 1156 within hollow flexible tube 1112, after assembly to needle 1104 and set of wings 1108. Conductor 1160 extends far enough within and/or through wings 1108 so that conductor 1160 makes electrical contact with needle 1104.

FIG. 16A is a top plan view of a simulated cannula 1600 according to yet another embodiment of the present invention. FIG. 16B is a cross-sectional side view of simulated cannula 1600 shown in FIG. 16A and taken along line B-B in FIG. 16A. FIG. 16B shows a section C centered around a coupler 1604. FIG. 16C is an enlarged view of section C shown in FIG. 16B. As shown in FIGS. 16A-16C, simulated cannula 1600 is shown connected to a connector cable 1696. Simulated cannula 1600 includes a coupler 1604 that enables a flexible, needle unit 1608 to be coupled with connector cable 1696. Herein, coupler 1604 is also referred to as a needle coupler assembly. Connector cable 1696 is a four-lead electrical conductor. Each of the two opposite male jacks at the respective ends of electrical conductor 1696 include four separate electrical contacts. Coupler 1604 is configured with four corresponding electrical contacts along the female jack at the connector end of coupler 1604, into which connector cable male jack is inserted. Although a particular arrangement of female jacks and male jacks is depicted, any suitable combination can be used. Each jack can comprise two leads, three leads, four leads, or the like.

As can be seen from comparing FIG. 16A with FIG. 16B, coupler 1604 can have a width that is greater than its thickness. Coupler 1604 secures a first end of an electrical conductor 1612, also referred to herein as a needle conductor, that extends through the entire length of a flexible tube component 1616 of flexible, needle unit 1608. In addition, coupler 1604 also secures a first end of an optical fiber 1620 that extends into, but not entirely through, flexible tube component 1616. Coupler 1604 comprises a coupler housing 1630 and a compression nut 1634. A micro-LED 1640 is mounted within coupler 1604 and positioned to direct light emitted therefrom into the first end of optical fiber 1620. Coupler 1604 comprises a printed circuit board 1650 to provide electrical circuitry between connector cable 1696 and the respective components of coupler 1604, including electrical conductor 1612 and micro-LED 1624.

Figure 17:
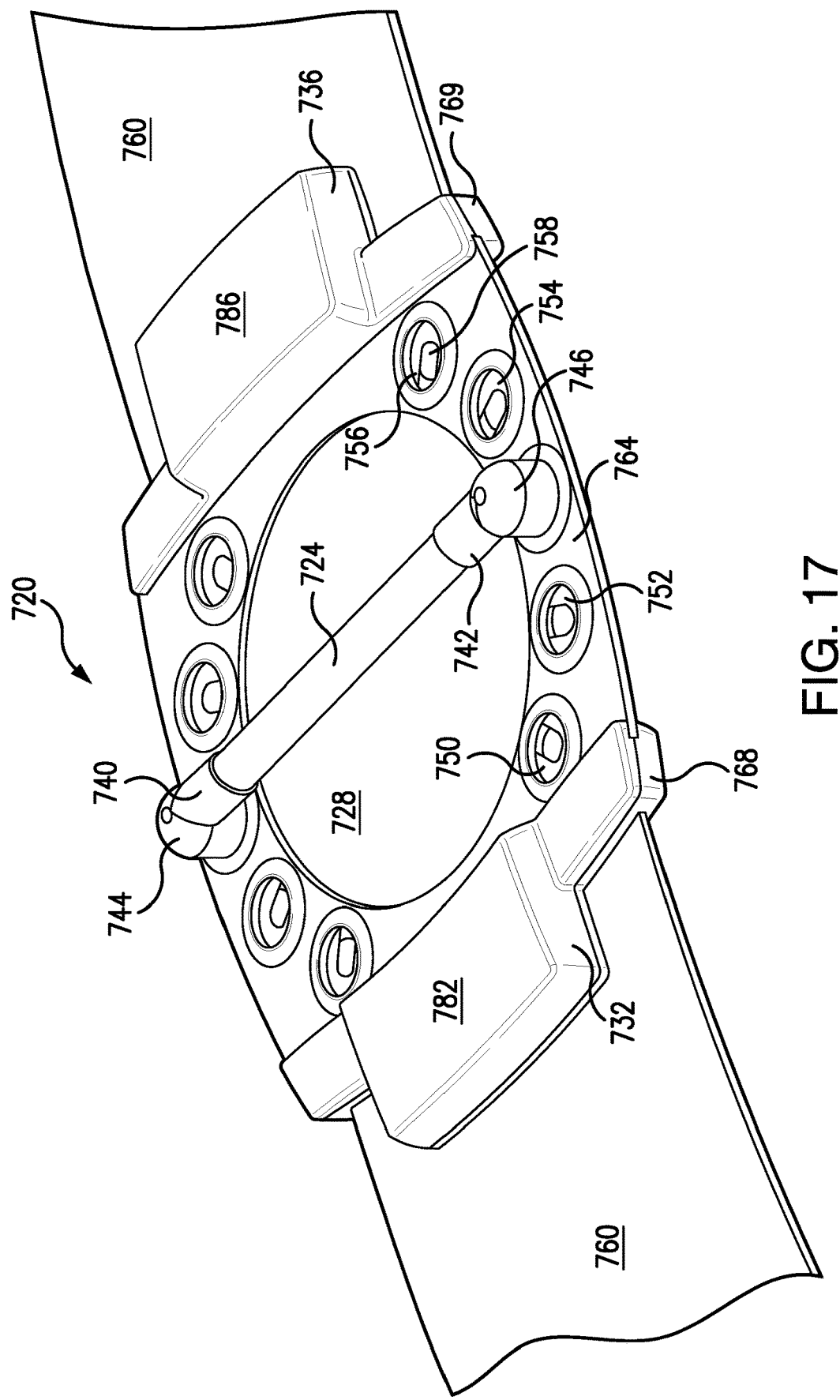
FIG. 17 is a top perspective view of a training prosthetic for self-cannulation training, according to an embodiment of the present invention, showing a simulated access bridging a cannulation pad, without a simulated skin covering being attached thereto.

FIG. 17 is a top perspective view of a training prosthetic 720 for self-cannulation training, according to an embodiment of the present invention, showing a simulated access 724 bridging a cannulation pad 728, without a simulated skin covering being attached thereto. In use, a simulated skin covering can be attached to the top of the prosthetic to mimic vasculature underneath skin. FIG. 17 shows a battery compartment cover 732 and a control unit cover 736, each of which is provided on a top surface thereof with a layer of hook-and-loop fastener, for example, as shown, a layer 782, 786, respectively, of hook fasteners. The hook-and-loop fasteners can be used to removably fasten a simulated skin covering (not shown) across cannulation pad 728, battery compartment cover 732, and control unit cover 736. The simulated skin covering can be designed to be a continuation of the material of the top surface of a belt 760 to which a frame 764 of cannulation pad 728 is secured. Frame 764 can be permanently or removably secured to belt 760. A pair of belt couplers 768, 769 can be configured to secure frame 764 of cannulation pad 728 to belt 760. Belt couplers 768, 769 can comprise plastic, NEOPRENE, or another suitable material, can be rigid, semi-rigid, or flexible, and can be bolted or otherwise fastened to be battery compartment cover 732 and a control unit cover 736, respectively, with a cannulation pad bottom layer, such as a NEOPRENE layer, pinched therebetween.

Simulated access 724 has a first end 740 and a second end 742, each of which can include a cap 744, 746, respectively, that holds or retains an electrically-conductive magnetic connector for magnetically securing the respective end of the simulated access to a respective connector holder 750, 752, 754, 756, and others. Each connector holder is configured for holding an electrically conductive magnetic connector of the simulated access. Each electrically conductive magnetic connector can independently comprise one or more magnets, for example, a plurality of magnets stacked one on top of the other.

Each connector holder 750, 752, 754, 756, and others, includes an electrical contact or terminal, for example, terminal 758 shown in connector holder 756. The terminals are electrically connected to a cannulation circuit such that, upon proper cannulation into simulated access 724, completes or closes a cannulation circuit through (1) an electrical conductor in a simulated cannula, (2) electrically conductive media within simulated access 724, (3) one or both electrically conductive magnetic connectors at ends 740, 742 of simulated access 724, (4) the terminal in the respective connector holder, and (5) a control unit that is in electrical contact with both the terminal and the simulated cannula. Although simulated access 724 is shown, in FIG. 17, as being connected to two opposing connector holders, the cannulation circuit could nonetheless by completed if the simulated access is connected at just one end, to a single connector holder.

Simulated access 724 can be connected to just a single connector holder or to any two connector holders, whether opposing, adjacent, spaced apart, or the like. Simulated access 724 can be conformed to any of a variety of different orientations, including, but not limited to, curved designs. Simulated access 724 can be conformed to mimic the actual fistula, vasculature, or access, of the trainee or of the patient for which the trainee is training to cannulate.

FIG. 18A is a plan view of a training prosthetic for self-cannulation training, according to an embodiment of the present invention, including training prosthetic 720 shown in FIG. 17, with a simulated skin covering 790 attached thereto. FIG. 18B is a side view of the training prosthetic for self-cannulation training, shown in FIG. 18A. As can be seen from FIGS. 18A and 18B, simulated skin covering 790 extends past battery compartment cover 732 and extends past control unit cover 736, longitudinally, and gently slopes to merge areas 792 and 794, respectively, where simulated skin covering 790 connects with belt 760. At merge areas 792 and 794, one or more patches or strips of fastener can be provided on belt 760, on simulated skin covering 790, or on both, to removably secure belt 760 and simulated skin covering 790, together.

FIG. 19A is a top perspective view of a training prosthetic 900 for self-cannulation training, according to another embodiment of the present invention. Training prosthetic 900 can be used with or without a simulated skin covering, and FIGS. 19A-19C show training prosthetic 900 without a simulated skin covering. FIG. 19B is an enlarged view of section 19B taken from FIG. 19A, and showing leveling patches 902, 904 adjacent a simulated access 906. FIG. 19C is a side view of the training prosthetic for self-cannulation training, shown in FIGS. 19A and 19B.

Leveling patch 902 is configured to fill the volume between simulated access 906 and the inside face of a battery compartment with cover, 912. Leveling patch 904 is configured to fill the volume between simulated access 906 and the inside face of a control unit with cover, 914. The top surfaces of one, or more, or all, of leveling patch 902, simulated access 906, battery compartment with cover 912, leveling patch 904, and control unit with cover 914, can be flush with one or more of the other top surfaces. The top surfaces of all of leveling patch 902, simulated access 906, battery compartment with cover 912, leveling patch 904, and control unit with cover 914, can be flush with one another. As can be seen particularly in FIG. 19C, the top surface of simulated access 906 can protrude above, bulge above, or otherwise slightly rise above, the top surfaces of one or more of leveling patch 902, battery compartment with cover 912, leveling patch 904, and control unit with cover 914. A cannulation pad 918 is secured to a belt 920 that is configured to wrapped around or straddle a limb of a trainee or of a patient to be cannulated by a trainee.

Training prosthetic 900 shown in FIGS. 19A-19C can be used with or without a simulated skin covering attached thereto. If a simulated skin covering is used, it can be designed to extends past battery compartment cover 732 and extends past control unit cover 736, longitudinally, and gently slopes to merge areas 792 and 794, respectively, where simulated skin covering 790 connects with belt 760. At merge areas 792 and 794, one or more patches or strips of fastener can be provided on belt 760, on simulated skin covering 790, or on both, to removably secure belt 760 and simulated skin covering 790, together.

Figure 20:
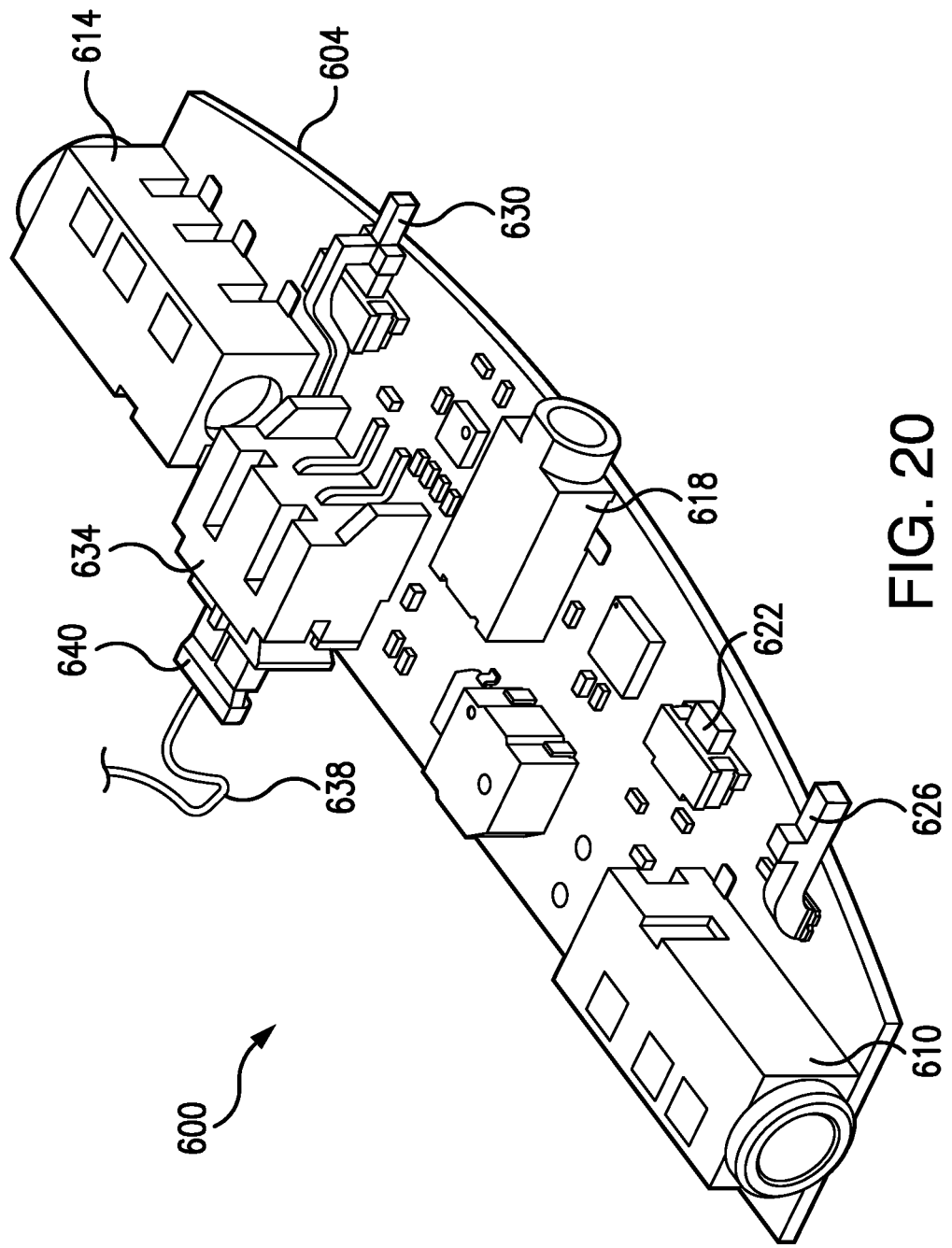
FIG. 20 is a top perspective view of a control unit for a training prosthetic for cannulation training, according to various embodiments of the present invention.

FIG. 20 is a top perspective view of a control unit 600 according to various embodiments of the present invention. Control unit 600 includes a printed circuit board 604 having a plurality of electrical leads or traces (not shown) formed on the underside thereof. On the top of printed circuit board 604 are mounted a plurality of components, including a first cable connector female jack 610, a second cable connector female jack 614, a charging cable female jack 618, a reset switch 622, a light pipe 626, a push button 630, a battery connecting cable jack 634, and a variety of processing chips, resistors, buses, capacitors, and other electrical components. A battery connecting cable 638 having a connecting jack 640 at an end thereof is shown connected to battery connecting cable jack 634. Light pipe 626 can guide light emitted from a source, for example, from a micro-LED source mounted on printed circuit board 604 and directed into a first end of light pipe 626.

The circuitry of the control unit can be configured to cause light pipe 626 to form different lights or patterns of light to indicate (1) whether the battery is charging, for example, by showing a steady pulse, (2) whether the battery is low, for example, by rapidly flashing, or (3) whether the power is on, for example, by showing a steady light. Different colored lights can be used to indicate different statuses of the control unit and battery. Push button 630 can be configured to glide along the top surface of printed circuit board 604 and can be guided by rails formed on or in printed circuit board 604. Push button 630 can be provided with a spring mechanism configured to alternate the distal end of the push button between an extended position and a depressed or retracted position.

Each of first cable connector female jack 610 and second cable connector female jack 614 can be sized and shaped to receive a 3.5 mm male jack, for example, at the end of a four-lead electrical cable. Other arrangements including other jacks and cables can be used. The electrical cables for which first cable connector female jack 610 and second cable connector female jack 614 are configured to receive can be connected at respective opposite ends to first and second cannulas, for example, cannulas as shown in FIGS. 11A-15B.

Figure 21:
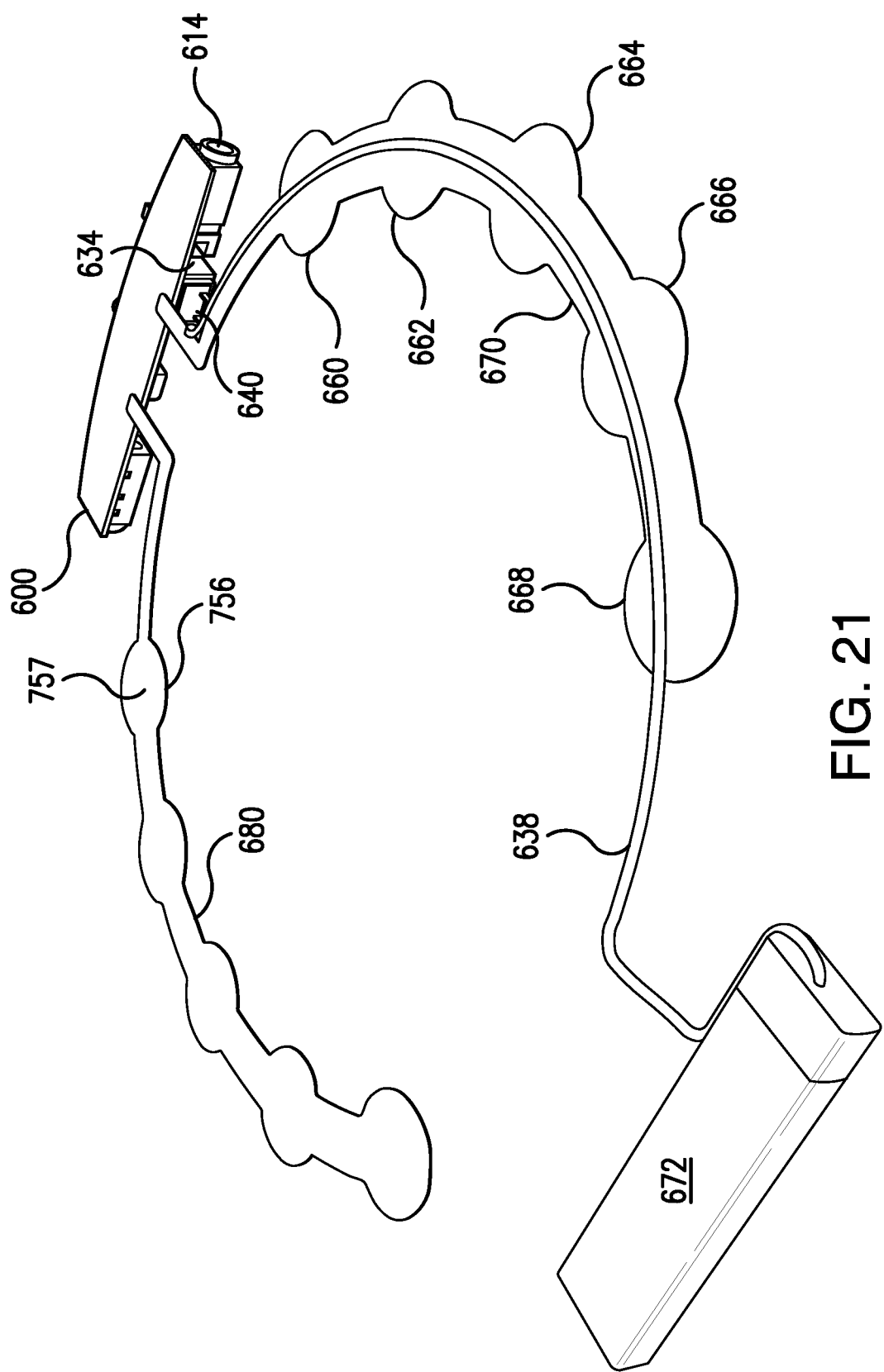
FIG. 21 is a bottom view of the battery circuit used for powering the control unit shown in FIG. 20.

FIG. 21 is a bottom view of a battery circuit used for powering control unit 600 shown in FIG. 20. Battery connecting cable 638 is connected, at connection jack 640, to battery connecting cable jack 634. Battery connecting cable 638 extends around and underneath a series of electrically connected cannulation pad contacts 660, 662, 664, 666, and 668 arranged along a cannulation pad branch 670 that is in electrical contact with the cannulation circuit including portions in control unit 600. Battery connecting cable 638 can be, for example, a two-lead or three-lead cable that terminates at and is in contact with a battery 672. Battery 672 can be, for example, a USB port-rechargeable lithium battery, a single-cell battery, a multi-cell battery, a nickel battery, an alkaline battery, a rechargeable alkaline battery, a coin-sized battery such as a CR 2023 battery, or the like.

The cannulation pad contacts are in electrical contact with respective terminals within respective connector holders, such as connector holders 750, 752, 754, and 756 shown in FIG. 17. An exemplary terminal is terminal 758 shown in FIG. 17. Cannulation pad contacts 660, 662, 664, 666, and 668 along with branch 670 can comprise an electrically-conductive mesh patch or a metallic layer or film, for example a 0.5 mm-thick stainless-steel layer cut, punched, molded, or otherwise formed from a stainless-steel sheet. Exemplary thicknesses include metallic layer thicknesses within the range of from 0.01 mm to 1.0 mm, from 0.05 mm to 0.8 mm, from 0.075 mm to 0.5 mm, from 0.1 mm to 0.5 mm, and 0.05 mm. Construction from a thin layer of metal can beneficially provide flexibility enabling the training prosthetic to be wrapped around or curved to conform to a limb. Steel, iron-containing, neodymium, cobalt, nickel, copper, gold, metal alloys, and the like can be used for the cannulation pad branch and cannulation pad contacts. Magnetic materials can be used.

A second cannulation pad branch 680 extends opposite cannulation pad branch 670, and in the exemplary embodiment shown, along a semi-circular arc like first cannulation pad branch 670. A plurality of cannulation pad contacts including cannulation pad contact 681 are provided along cannulation pad branch 680. Second cannulation pad branch 680 can be made of the same or different materials relative to first cannulation pad branch 670. While the bottom surface of cannulation pad contact 756 is shown in FIG. 21, the opposite, top surface of cannulation pad contact 756 would, have formed thereon, terminal 758 shown in FIG. 17.

Figure 22:
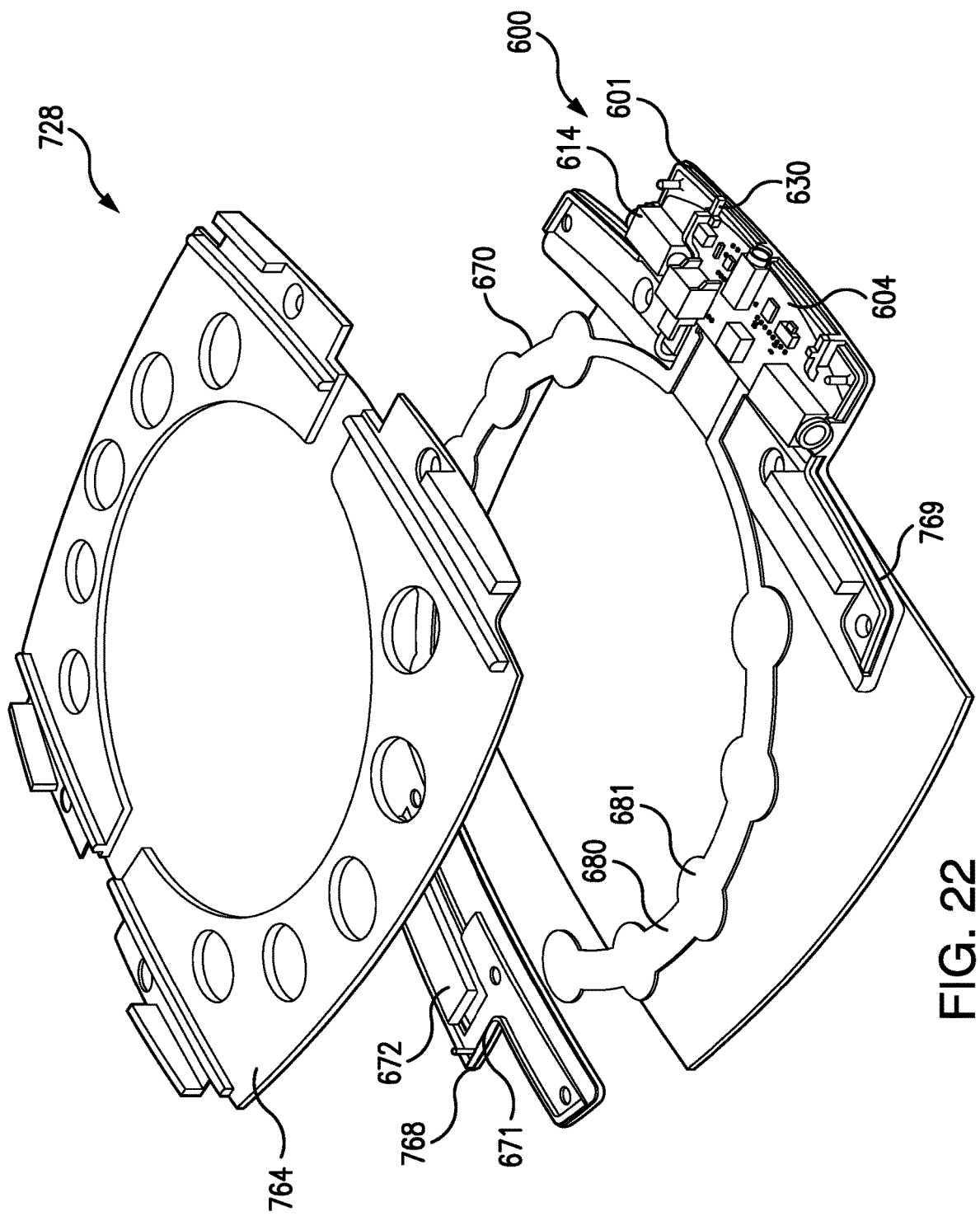
FIG. 22 is an exploded top perspective view of components of a training prosthetic according to various embodiments of the present invention.

FIG. 22 is an exploded top perspective view of components of a training prosthetic according to various embodiments of the present invention, including the control unit 600 shown in FIG. 20 and the cannulation circuit circuitry shown in FIG. 21. As shown in FIG. 22, cannulation pad 728 includes a frame 764 to which are secured belt couplers 768, 769, a battery compartment 671, a control unit compartment 601, first cannulation pad branch 670, second cannulation pad branch 680, and a bottom layer comprising, for example, NEOPRENE that is bonded, once assembled, to the underside of frame 764.

Figure 23:
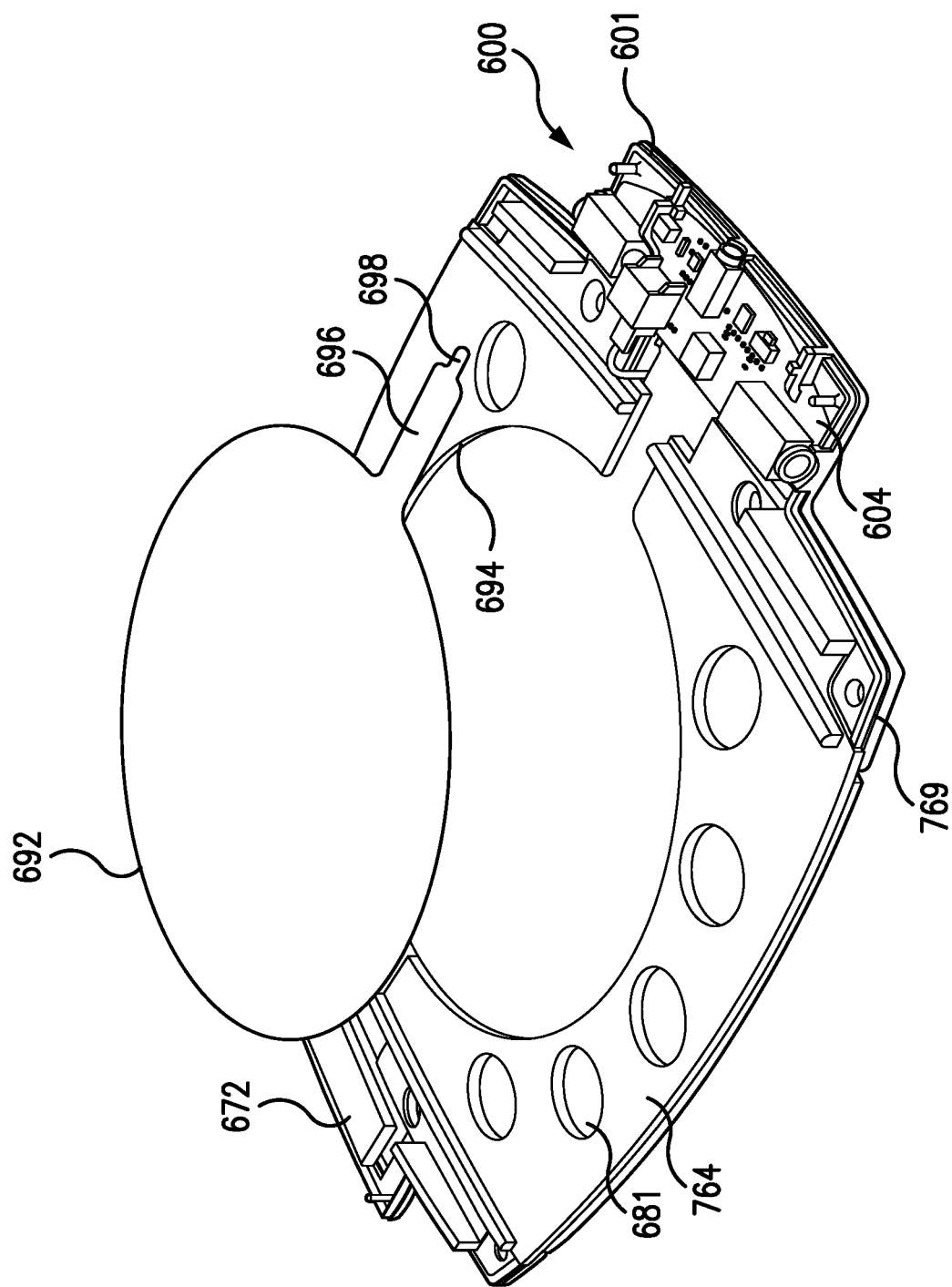
FIG. 23 is a top perspective view of the assembly of parts shown in FIG. 22, ready to receive a needle shield within a complimentary recess formed in the cannulation pad frame.

Subsequent to assembly of the layers shown in FIG. 22, or as part of the assembly, a needle shield 692 is secured within a complimentary recess 694 formed in frame 764, as shown in FIG. 23. Needle shield 692 can comprise a flat 0.010 inch-thick stainless-steel layer attached to frame recess 694 by a pressure sensitive adhesive, double-sided tape, hook and loop fasteners, or the like. Needle shield 692 is provided with a stem 696 terminating in a contact tip 698 that makes appropriate electrical contact with a corresponding contact on or in control unit 600.

Figure 24:
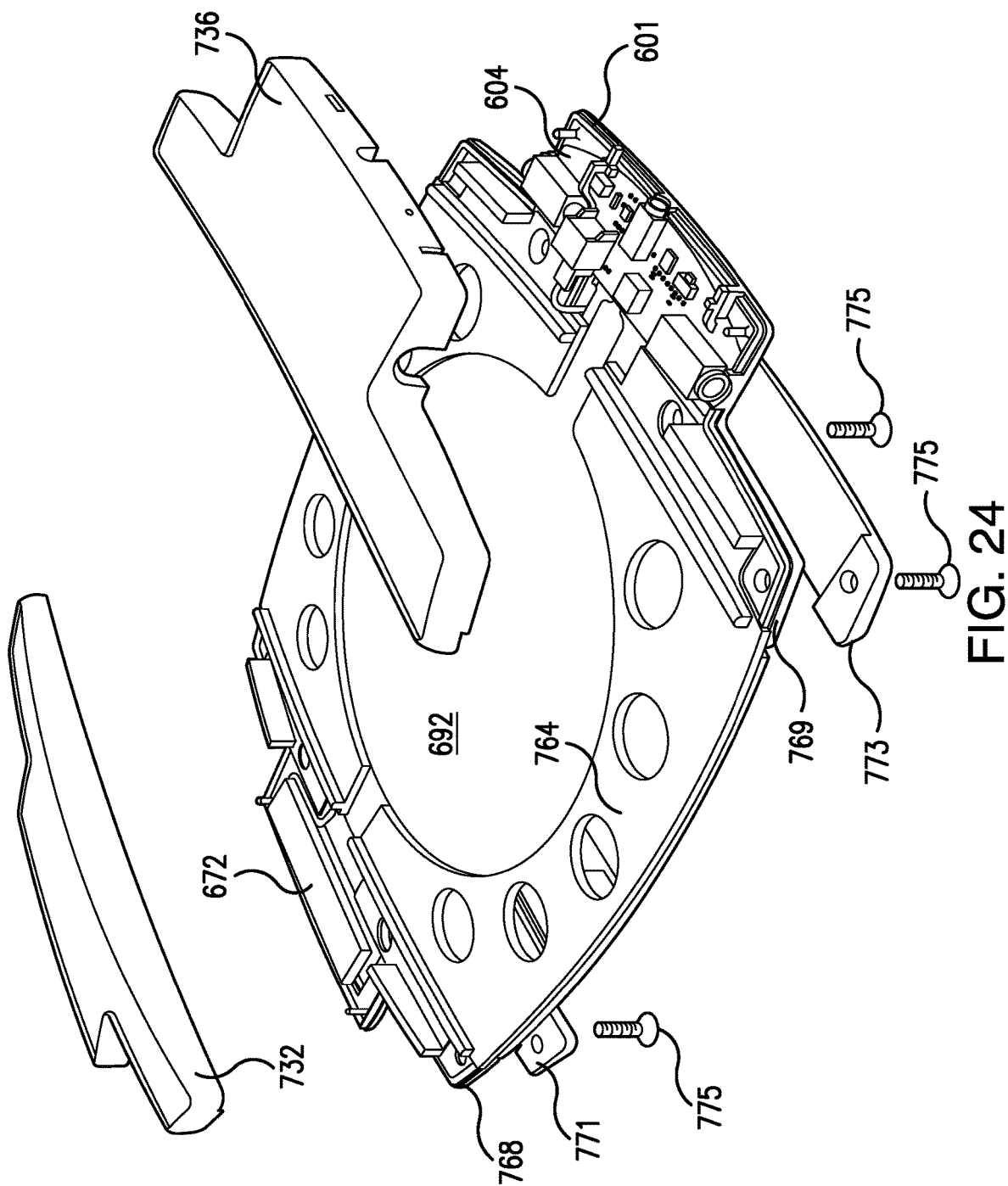
FIG. 24 is a top, perspective, partially exploded view of the assembly shown in FIG. 23, assembled together, and prior to the fastening of a battery compartment cover, a control unit compartment cover, and strap bars.

FIG. 24 is a top, perspective, partially exploded view of the exploded assembly shown in FIG. 23, but assembled together, and prior to the fastening of battery compartment cover 732, control unit compartment cover 736, and strap bars 771 and 773. Strap bars 771 and 773 can comprise a plastic, elastomeric, metal, rubber, or polymeric material, or the like. Strap bars 771 and 773 can comprise NEOPRENE. Screws 775 can be used to fasten strap bars 771 and 773 to battery compartment cover 732 and control unit compartment cover 736, respectively. Instead of or in addition to screws 775, bolts, rivets, or other fasteners can be used. M3 thread-forming screws can be used. Screws 775, but for their heads, can pass through respective through-holes in strap bars 771 and 773, and through-holes through belt couplers 768, 769.

Figure 25:
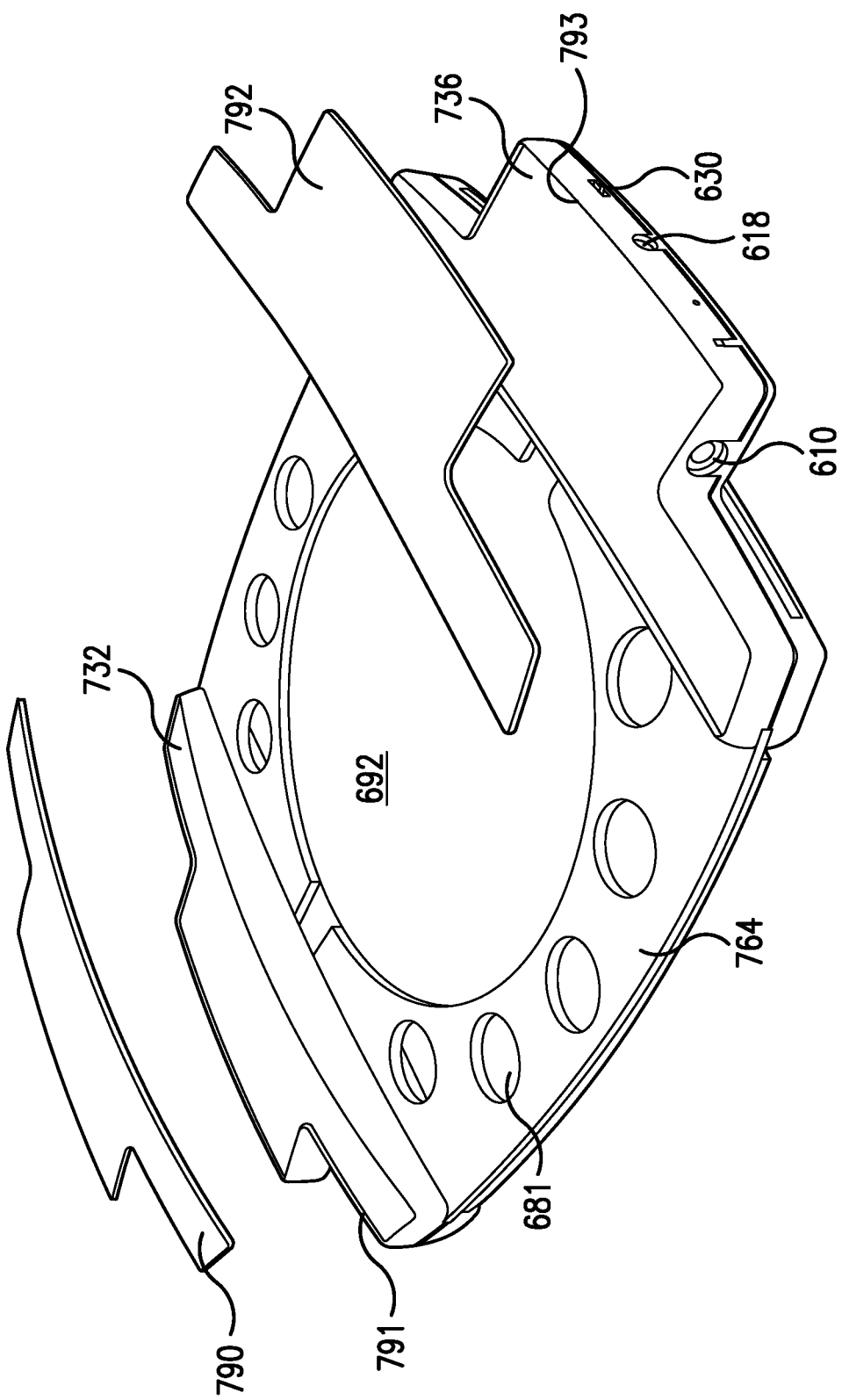
FIG. 25 is a top perspective view of an assembly comprising the components shown in FIG. 24, after being assembled together.
Figure 26:
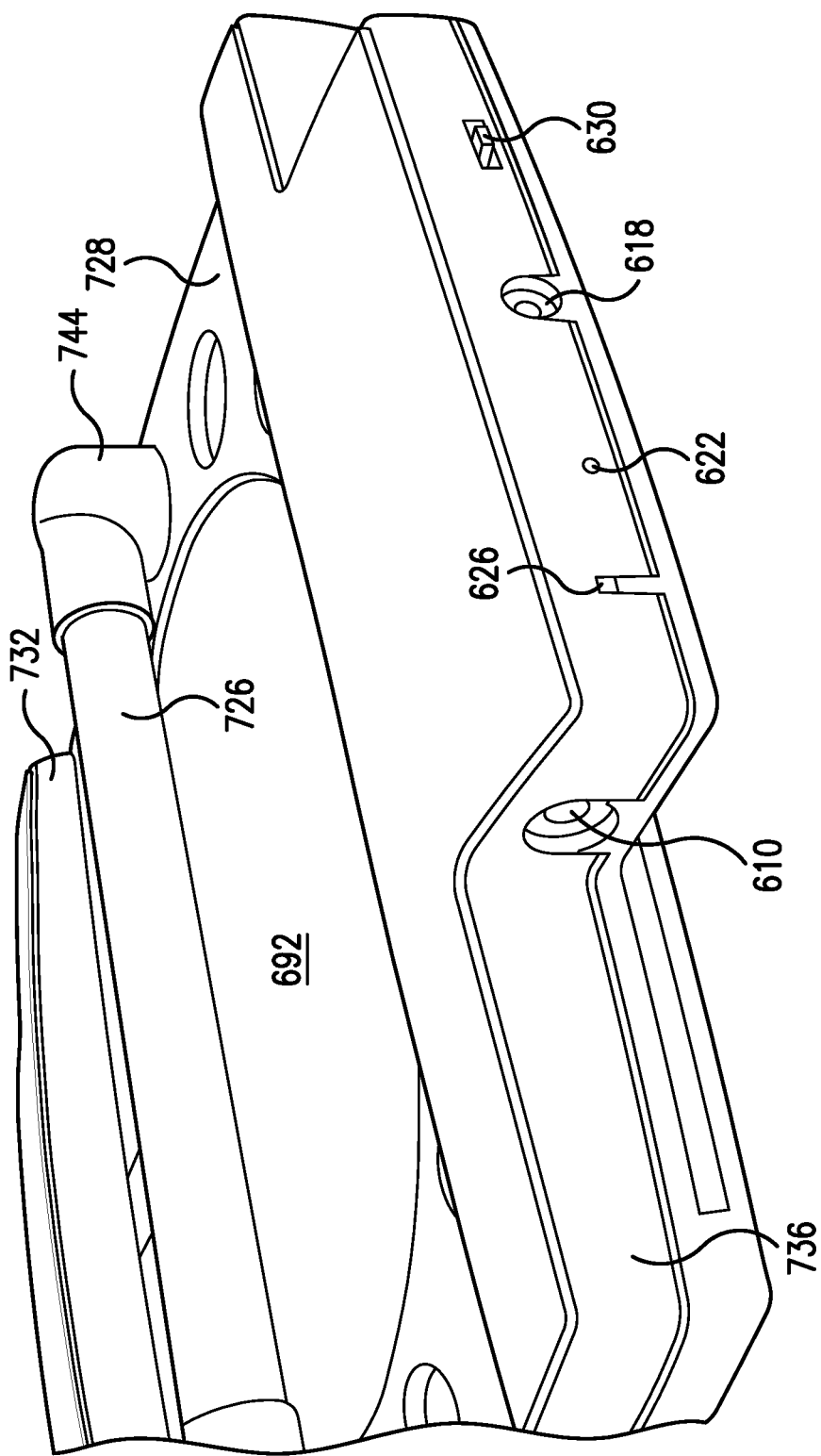
FIG. 26 is a top perspective view of the assembly shown in FIG. 25, after the hook and loop fastener patches shown in FIG. 25, have been applied.

FIG. 25 is a top perspective view of an assembly comprising the components shown in FIG. 24 assembled together, subsequent to fastening screws 775 into respective, aligned, threaded receiving bores (not shown) provided in the undersides of battery compartment cover 732 and control unit compartment cover 736. As can be seen, battery compartment cover 732 has a ridge along the periphery of its top surface, which defines a fastener patch receiving area or pocket 791. Control unit compartment cover 736 has a ridge along the periphery of its top surface, which defines a fastener patch receiving area or pocket 793. A hook and loop fastener patch 790, for example, comprising only hook fasteners, can be secured within pocket 791. The securing can be provided, for example, by a layer of pressure sensitive adhesive. A hook and loop fastener patch 792, for example, comprising only hook fasteners, can be secured within pocket 793, with the securing can be provided, for example, by a layer of pressure sensitive adhesive. Once assembled, the assembly is as shown in FIG. 26. FIG. 26 also shows a simulated access 724 connected to cannulation pad 728 and bridging needle shield 692.

The training system of the present invention can be used in conjunction with a virtual reality (VR) simulation system, for example, through a first-person (self) cannulation simulation or through a second-person cannulation simulation. The VR simulation system can be operatively connected to the training system. The simulation can be presented in a way that utilizes the tactile elements of the training system to augment what the user would be viewing through a VR headset. A VR headset can be used to afford a more realistic appearance for the simulation and to enable a lesson to be immersive and surrounded by contextual digital materials, such as labeling, tips, suggestions, other lesson-appropriate information, combinations thereof, and the like. For example, an angle-of-approach, a direction of a needle, and the like, can be evaluated digitally to provide automated feedback. Bruit, other sounds, and the like can be added to the experience via a VR headset.

The training system can be used in conjunction with an augmented reality (AR) simulation system, for example, through a first-person (self) cannulation simulation or through a second-person cannulation simulation. The AR simulation system can be operatively connected to the training system. An AR headset can be used. When using an AR headset, a self-cannulating user can be enabled to have the same auditory benefits as with a VR headset, but an image stream can be layered on top of what the user is actually viewing. The tactile elements of the device can be partnered with additional digitally placed elements and cues from the AR simulation system to afford a richer experience for the user.

With a VR or AR simulation system, a guidance system can be included. The guidance system can include at least an augmented reality device having a display, a camera configured to capture image data, and a computing system. The computing system can include at least a processor and a memory. The memory can store computer-readable instructions that, upon execution by the processor, configure the computing system to perform steps. The computing system can receive a user input from a user, and the user input can include a target internal vein or artery of the patient. The computing system can process image data captured by the camera, and the image data can include at least an image of the vasculature of the patient or of the cannulation training system, for example, an image of the simulated access. Processing the image data can include identifying at least one vasculature or access feature of the patient or training system. The computing system can determine a cannulation location based on the processed image data and the user input. The computing system can generate output data for the display of the VR or AR device. The output data can include target indicia. With an AR system, the target indicia can overlay an image of the patient or training system at the vasculature or simulated access location.

An augmented reality device can be used that includes the computing system, the display, and the camera. Alternatively, the augmented reality device can be separate from the computing system and the camera, and, in such embodiments, the computing system, the augmented reality device, and the camera can communicate with one another via a hard-wired interface, a wireless interface, or a combination thereof.

The augmented reality device can include a smart device. The smart device can be, for example, a smart phone, a tablet, a smart watch, smart glasses, or the like. The smart device can be a smart phone that can include, for example, a touchscreen interface. The computer-readable instructions can be in the form of application software loaded on the memory, for example, an app loaded on a smart phone or tablet.

The smart device can be in the form of a head mount, such as smart glasses. The head mount can include the computing system, the display, the camera, and other sensors. The display of the head mount can be at least partially transparent. The at least partially transparent display can be configured to display augmentation graphics such as semi-opaque images that appear to a user to be superimposed on at least a portion of a natural field of view of the user. Other apparatus, devices, components, systems, and methods related to VR and AR, which can be used or incorporated in accordance with the present invention, include those described, for example, in U.S. Pat. No. 10,726,744 B2, which is incorporated herein in its entirety by reference.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A simulated cannula for a self-cannulation training system, comprising a first unit and a second unit, wherein:
   the first unit comprises a hollow flexible tube and a rigid cannulation needle, the hollow flexible tube having a first length, a first end, and a second end, the rigid cannulation needle comprising an electrically conductive material, having a pointed needle end, a connector end opposite the pointed needle end, a contact surface at the connector end for contacting an electrical conductor, and being connected to the hollow flexible tube at the first end of the hollow flexible tube, wherein the second end of the hollow flexible tube has an opening; and
   the second unit comprising a coupler and an electrical conductor, the coupler having a front end and a rear end, wherein the front end of the coupler comprises a tube connector configured for connecting to the second end of the hollow flexible tube, the electrical conductor is fixed to the coupler, the conductor extends from the front end of the coupler through the tube connector, and the electrical conductor has a second length that is greater than the first length.

2. The simulated cannula of claim 1, wherein the coupler comprises a coupler housing and a light source housed in the coupler housing.

3. The simulated cannula of claim 2, wherein the second unit further comprises an optical light guide, and the optical light guide is fixed to the coupler and extends from the front end of the coupler through the tube connector, adjacent the electrical conductor.

4. The simulated cannula of claim 3, wherein the light source comprises a light-emitting diode.

5. The simulated cannula of claim 4, wherein the optical light guide comprises an optical fiber, the optical fiber has a third length, and, when the second end of the of the hollow flexible tube is connected to the tube connector, the optical fiber extends into, but not through, the hollow flexible tube.

6. The simulated cannula of claim 5, wherein the third length is at least 50% the length of the second length.

7. The simulated cannula of claim 1, wherein the rear end of the coupler comprises a connector jack.

8. The simulated cannula of claim 7, wherein the connector jack is a female connector jack.

9. The simulated cannula of claim 7, wherein the connector jack is a four-lead connector jack.

10. The simulated cannula of claim 1, wherein the coupler comprises a coupler housing and a compression nut, the compression nut is configured to be threaded onto the coupler housing, the compression nut has a central through bore having an inner diameter, and the inner diameter is at least as large as an outer diameter of the hollow flexible tube.

11. The simulated cannula of claim 1, wherein the first unit and the second unit are assembled together.

12. A self-cannulation training system comprising the simulated cannula of claim 1 and further comprising:
    a cannulation pad comprising a cannulation electrical circuit conductor, an infiltration electrical circuit conductor, and an insulating layer electrically insulating the cannulation electrical circuit conductor from the infiltration electrical circuit conductor;
    a simulated access configured to be electrically connected to the cannulation electrical circuit conductor and comprising an outer sheath and an electrically conductive material retained inside the sheath;
    a control unit comprising a power source, a first electrical connector for connecting the power source to both the cannulation electrical circuit conductor and the infiltration electrical circuit conductor, and a second electrical connector for connecting the power source to the cannula connector;
    a first indicator in electrical contact with the electrical conductor and configured to be activated when the cannula needle electrically contacts the cannulation electrical circuit conductor to form a cannulation electrical circuit; and
    a second indicator, different than the first indicator, in electrical contact with the electrical conductor and configured to be activated when the cannula needle electrically contacts the infiltration electrical circuit conductor to form an infiltration electrical circuit.

13. The self-cannulation training system of claim 12, wherein the first indicator comprises a light indicator and the second indicator comprises a vibrator, a sound alarm, or a combination thereof.

14. The self-cannulation training system of claim 12, wherein the first indicator comprises a red light-emitting diode.

15. A self-cannulation training system comprising the simulated cannula of claim 5 and further comprising:
    a cannulation pad comprising a cannulation electrical circuit conductor, an infiltration electrical circuit conductor, and an insulating layer electrically insulating the cannulation electrical circuit conductor from the infiltration electrical circuit conductor;
    a simulated access configured to be electrically connected to the cannulation electrical circuit conductor and comprising an outer sheath and an electrically conductive material retained inside the sheath;

a control unit comprising a power source, a first electrical connector for connecting the power source to both the cannulation electrical circuit conductor and the infiltration electrical circuit conductor, and a second electrical connector for connecting the power source to the cannula connector;

a first indicator in electrical contact with the electrical conductor and configured to be activated when the cannula needle electrically contacts the cannulation electrical circuit conductor to form a cannulation electrical circuit;

a second indicator, different than the first indicator, in electrical contact with the electrical conductor and configured to be activated when the cannula needle electrically contacts the infiltration electrical circuit conductor to form an infiltration electrical circuit; and a multi-lead electrical cable, wherein the rear end of the coupler comprises a multi-lead connector jack and the multi-lead electrical cable electrically connects the multi-lead connector jack to the control unit.

16. The self-cannulation training system of claim 15, wherein the power source comprises a rechargeable lithium battery.

* * * * *